(12) United States Patent
Forutanpour et al.

(10) Patent No.: US 8,717,151 B2
(45) Date of Patent: May 6, 2014

(54) DEVICES AND METHODS FOR PRESENTING INFORMATION TO A USER ON A TACTILE OUTPUT SURFACE OF A MOBILE DEVICE

(75) Inventors: Babak Forutanpour, San Diego, CA (US); David Bednar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 13/107,681

(22) Filed: May 13, 2011

(65) Prior Publication Data

US 2012/0286944 A1 Nov. 15, 2012

(51) Int. Cl.
*H04B 3/36* (2006.01)
(52) U.S. Cl.
USPC ............ 340/407.1; 340/407.2; 345/173
(58) Field of Classification Search
USPC ......... 340/407.1, 407.2; 345/156, 173, 174
See application file for complete search history.

(56) References Cited

U.S. PATENT DOCUMENTS

| | | | |
|---|---|---|---|
| 7,138,985 B2 | 11/2006 | Nakajima | |
| 7,382,357 B2 | 6/2008 | Panotopoulos et al. | |
| 2002/0158836 A1* | 10/2002 | Ishmael et al. | 345/156 |
| 2006/0234768 A1* | 10/2006 | Goris et al. | 455/556.1 |
| 2007/0176742 A1* | 8/2007 | Hofmann et al. | 340/7.6 |
| 2008/0136587 A1 | 6/2008 | Orr | |
| 2008/0150911 A1 | 6/2008 | Harrison | |
| 2009/0250267 A1 | 10/2009 | Heubel et al. | |
| 2009/0315832 A1 | 12/2009 | Gray | |
| 2009/0325645 A1 | 12/2009 | Bang et al. | |
| 2010/0062724 A1* | 3/2010 | Fok et al. | 455/67.11 |
| 2011/0179388 A1* | 7/2011 | Fleizach et al. | 715/840 |
| 2011/0285637 A1* | 11/2011 | Karkkainen | 345/173 |

OTHER PUBLICATIONS

International Search Report and Written Opinion—PCT/US2012/037835—ISA/EPO—Aug. 17, 2012.

* cited by examiner

*Primary Examiner* — Hai Phan
*Assistant Examiner* — Ojiako Nwugo
(74) *Attorney, Agent, or Firm* — James T. Hagler

(57) ABSTRACT

Methods and devices provide a tactile output surface that can communicate information to users via their sense of touch. The tactile output surface may include a plurality of tactile elements which may be activated to represent various information in a manner that can be understood by touching the device. A mobile device may present tactile output surfaces on one or multiple surfaces, and the user may touch the device after of tactile feedback functionality to obtain information from the one or more tactile output surfaces. In an embodiment, a mobile device may be configured to obtain information from an information source and present the information on a tactile output surface so that the user can perceive the information without having to look at the device. A variety of technologies may be used to create actuatable tactile elements.

64 Claims, 17 Drawing Sheets

| 602 | 604 | 606 | 608 |
|---|---|---|---|
| Input Event | Information/units | Representation Range | Tixel ratio (# per tixel) |
| Two taps on device | Unread e-mails (# new messages) | 0 – 20 | 4 |
| Key press | Distance from (# of miles) | 0-100 | 20 |
| Flip device orientation | Time remaining until appt. (# of minutes) | 0-30 | 6 |

FIG. 6A

| 602 | 610 | 612 | 614 | |
|---|---|---|---|---|
| Input Event | First bar | Second bar | Third bar | ... |
| Two taps on device | Unread e-mails | Distance from destination (# of miles) | Time remaining until appt. (# of minutes) | |
| Key press | ... | ... | ... | |

| 604a | 606a | 608a |
|---|---|---|
| Information/unit | Range | Tixel ratio |
| Unread e-mails (# new msgs) | 0 – 20 | 4 |

| 604b | 606b | 608b |
|---|---|---|
| Information/unit | Range | Tixel ratio |
| Distance (# miles) | 0 – 100 | 11 |

FIG. 6B

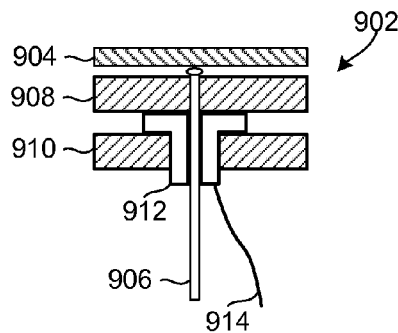
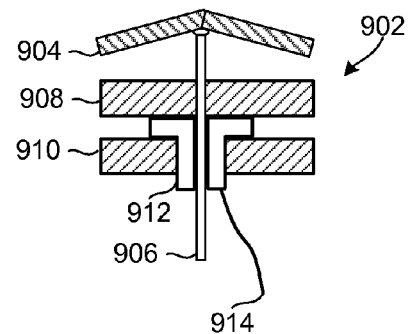
FIG. 9A    FIG. 9B
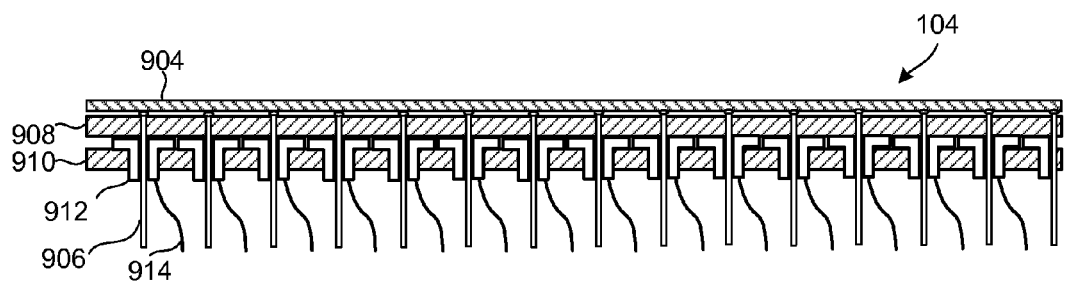
FIG. 9C
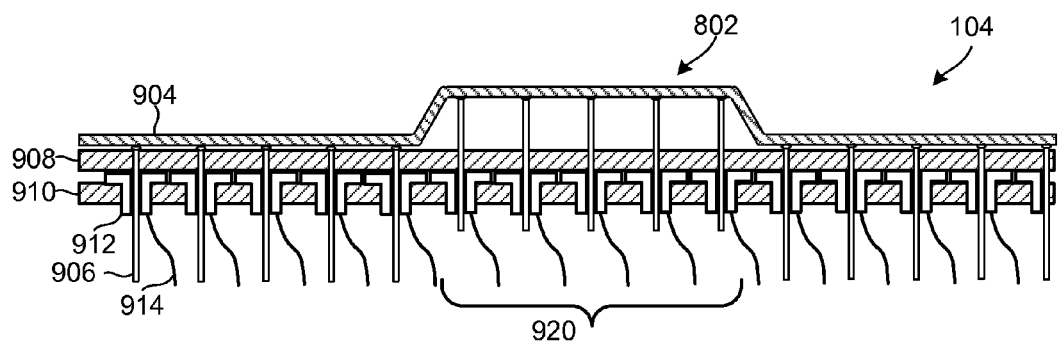
FIG. 9D

1

DEVICES AND METHODS FOR PRESENTING INFORMATION TO A USER ON A TACTILE OUTPUT SURFACE OF A MOBILE DEVICE

FIELD OF THE INVENTION

The present invention relates generally to mobile device user interface systems and more particularly to a haptics-based interface that provides information to a user.

BACKGROUND

Personal electronic devices (e.g. cell phones, PDAs, laptops, gaming devices) provide users with increasing functionality. In addition to serving as personal organizers, personal electronic devices serve as portals to the Internet and electronic mail. These devices allow users to access a wide range of information through their device, such as messages in multiple accounts, social networking sites, and, if configured with a GPS receiver, location and geographical distance information. Due to their portability, small size, communications capabilities and computing power, mobile devices application developers and users are creating new uses and functions for mobile devices.

SUMMARY

The various embodiments provide devices and methods in which information can provided to mobile device users without generating a visual display or sounding an auditory output. The various embodiments allow users to "feel" information provided by a mobile device so that others may not be aware of the output and so the device may remain out of sight (e.g., in a pocket or bag). In an example embodiment, information may be represented on the surface of a mobile device in tactile (e.g., raised or haptic) output surfaces.

The various embodiments include a tactile output surface coupled to a processor of the mobile device, and methods for presenting on the tactile output surface information from a variety of data sources. The embodiments may format information for presentation on a tactile output surface by scaling the information to match a range assigned to the tactile output surface, calculating a relative magnitude value by dividing the scaled information by the range assigned to the tactile output surface, and using the calculated relative magnitude value as the formatted information. Such information may be presented to the user by creating sensible features on a tactile output surface, in which the dimensions, shape, and/or orientation of the sensible features on the surface. Creating sensible features on the tactile output surface may involve activating at least one tactile unit that creates a tactile effect that can be felt by a user touching the tactile output surface. Creating a tactile effect that can be felt by a user may involve raising a portion of the surface, depressing a portion of the surface, changing a roughness of a portion of the surface, vibrating a portion of the surface, generating an electrostatic field than can be sensed in skin of the user, changing a temperature of a portion of the surface, and combinations of these effects. The information that is presented on a tactile output surface may be any type of information, which may be obtained from internal or external data stores or generated by a function.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 6A is a data structure diagram of an information table useful with an embodiment to enable a mobile device to associate different user inputs with various applications that may be implemented to provide information to the user via a tactile output surface.

FIG. 6B is a data structure of an information data table useful with an embodiment to enable a mobile device to display example types of information on multiple tactile output surfaces.

FIGS. 9A-9D are cross-sectional views of a raised tactile output surface in an embodiment featuring pins driven by linear actuators.

DETAILED DESCRIPTION

Figure 1A:
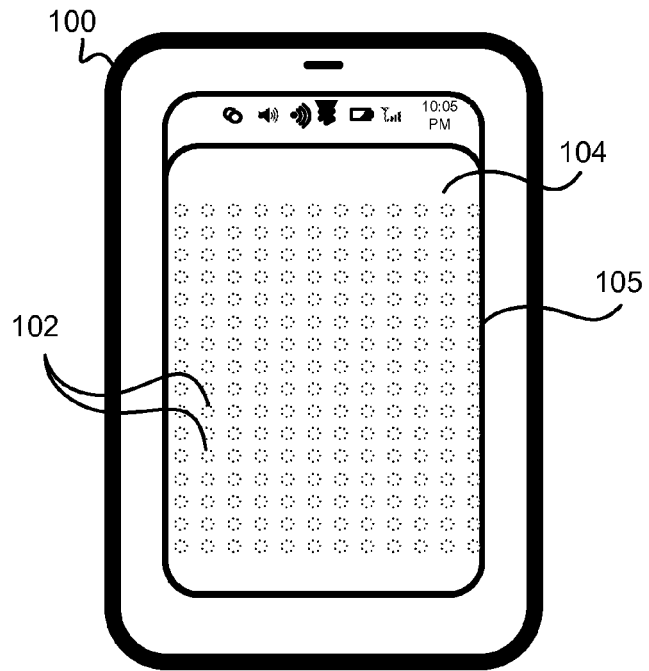
FIG. 1A is a frontal view of a mobile device illustrating a tactile output surface according to an embodiment.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "mobile computing device", and "computing device", "refer to any one or all of cellular telephones, personal data assistants (PDA's), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices which include a tactile feedback surface on an exterior surface.

The term "tap gesture" is used herein to mean a touch or tap on a mobile device that the mobile device can sense based upon a touch to a touch sensitive surface, such as a touch screen or touchpad, or acceleration of the device as measured by an accelerometer.

As used herein, an "input event" refers to a detected user input to a mobile device which may include key presses, tap gesturers, or a change in spatial orientation of the mobile device. For example, on a touchscreen or touchpad user interface device, an input event may refer to the detection of a user touching the device with one or more fingers.

Haptics is the branch of psychology that investigates cutaneous sense data. The term "haptic" is used herein to refer to devices that generate sensations in the skin that may be perceived by a person touching or nearly touching the device. As discussed below, there are technologies that can evoke a sense of touch even though the surface is smooth. Examples include electrostatic and vibrating surfaces.

As used herein, the term "tactile output surface" refers to various embodiments which are configured to communicate information by generating a surface feature that can be felt by a user through the sense of touch, such as through the finger tips. The various embodiments include different types of tactile output surfaces, such as surfaces configured to raise a portion of the surface to create a bump or raised portion that can be felt, haptic surfaces which can create a texture or sensation that can be felt through fingers (e.g., an electrostatic), and vibrating surfaces (e.g., surfaces with piezoelectric actuators) that generate localized vibrations that can be felt by a user. As used herein, a "haptic output surface" is a type of tactile output surface that uses haptic mechanisms. Since haptic output surfaces are example types of tactile output surfaces, references to "haptic" and "haptic output surfaces" should not be construed to limit the claims to any particular type of tactile technologies except as specifically recited in the claims.

As used herein, the term "tixel" (from the contraction of "texture" and "pixel") refers to a smallest portion of a texture-based tactile output surface that can be activated individually. For example, a tactile surface made up of a plurality of tixels may be configured such that tixels are arranged in a two-dimensional grid or array conceptually similar to pixels in a visual display. By individually actuating tixels, a mobile device processor can generate a tactile pattern that communicates information to a user via the user's sense of touch. Reference to tixels in the various embodiments described herein is made merely as one example tactile output surfaces that may be used, and is not intended to limit the embodiments or claim elements.

As used herein, the term "vixel" (from the contraction of "vibration" and "pixel") refers to a smallest portion of a vibrating haptic surface that can be vibrated individually. For example, a tactile output surface made up of a plurality of vixels may be configured such that vixels are arranged in a two-dimensional grid or array conceptually similar to pixels in a visual display. By individually vibrating a pattern of vixels, a mobile device may generate a tactile pattern that can communicate information to a user via the user's sense of touch.

Personal computing devices rely upon user interface devices to receive commands and data inputs from and to provide output to users. A few types of user interface devices have become standard, including the keyboard, computer mouse, touchpads, touchscreen displays, and trackballs. Such conventional user interface devices may be specialized for particular types of input and/or output tasks, such as entering text or typing commands (e.g., a keypad or keyboard), navigating within a graphical user interface (e.g., a computer mouse or trackball), graphically displaying information (e.g., an LCD monitor), and audio feedback (e.g., speakers). Touchscreens have become popular for some computing devices since they enable users to navigate a user interface and make inputs via a single user interface surface. Currently, mobile devices communicate information to users via either a display that the user must look at or audio sounds that can be heard by everyone nearby. The exception to this is Braille output devices that communicate through the sense of touch with those trained to read Braille.

Currently, touch sensing technologies, such as used in touchscreens, are also being widely developed and integrated into mobile device user interfaces to allow users to perform a variety of tasks using touch inputs. However, such technologies do not address the manner in which a device provides information and/or feedback to a user.

Today, there are also technologies that enable a mobile device to execute a function or command with minimal user interaction, such as voice activated calling, key press shortcuts, touch screen taps, etc. For example, three taps to a mobile device, which may be sensed by accelerometers in the device, may be interpreted as a user input command to advance an mp3 player to the next song. A benefit of such minimal user interface techniques and technologies is that users do not need to take the mobile device out of their pocket or bag and unlock it in order to accomplish a given task. There are also many systems today that allow a user to set a mobile device to output event alerts (e.g., an alarm, incoming call, new text message, etc.) by vibrating. For example, users frequently set their cell phones to vibrate mode in circumstances in which audio alerts would be disruptive, such as during a meeting or in quiet area.

A shortcoming of conventional information output devices and mechanisms is their inability to communicate information to the user without requiring the user to look at or listen to the mobile device. Further, the current types of vibration settings on devices as an alternative to audio alerts inform users only of the occurrence of an event for which the vibration mode is set (e.g., an incoming phone call). Thus, users not trained to read Braille have no options for receiving information from their mobile devices except looking at their displays or setting them to speak or otherwise audibilize the information in a manner that is not private.

To overcome these limitations, the embodiments utilize a variety of tactile or haptic technologies that allow users to feel information by touching their mobile devices. In the various embodiments, a tactile output surface may function similar to a visual display for outputting information in a manner that a user can "feel" in order to communicate information without the user having to look at or listen to the mobile device. For example, a user may feel information while a device remains in the user's pocket, thereby leaving the user's vision focused on driving, or not divulging that the user is checking the mobile device in a meeting. Rather than feedback from a mobile device being a generalized event (e.g., vibrating to indicate reception of a new message), a tactile output surface of the various embodiments may be localized to specific regions of the mobile device, and the location of tactile features or haptic actuations may convey information. Further, a tactile output surface may be placed on any surface of the mobile device. For example, a tactile output surface may be positioned on the back of a mobile device, and thus can supplement a visual display that may be on the front surface. As another example, tactile elements may be implemented on a display, such as a touch screen display, to convey information to users via their sense of touch as well as visually.

The sense of touch is initiated by cutaneous sensory receptors (i.e., sensory neurons) such as in the finger tips. Various types of cutaneous receptors have different preferential activation thresholds for sensing movement, pain, pressure, vibration, and temperature, and thus the sense of touch is different on different parts of the body. Receptors for every sensory modality, including the sense of touch, are limited by the amount of stimulation necessary to elicit a sensation (absolute threshold). The absolute threshold of a tactile feature that can be felt depends on the spatial resolution required for stimuli, which for tactile senses is determined in large part by the density of cutaneous receptors. In the human somatosensory system, fingertips are among the areas with the highest spatial resolution of receptors, and the brain process sensory input from the hands and fingers with a high degree of discrimination relative to the sense of touch of other body parts. The resolution of peripheral mechanoreceptive units (touch receptors) in the finger tips is approximately 1 mm, so surface features smaller than this may not be resolved (i.e., sensed as separate raised areas). In addition to surface textures and raised features, humans can sense vibrations. Taking into account the various receptor types, vibrations may be felt at 10-1000 Hz, with an optimum frequency at approximately 250 Hz. In addition to these senses of touch, humans can also feel electrostatic potentials on a surface and temperature differences (hot or cold compared to ambient or body temperature). Any and combinations of these senses of touch may be used in a tactile output surface.

The relative sensitivity of the various sensory modalities may be determined by comparing the amount of stimulus change that can be detected by each sense for typical users. The difference threshold, also called the "just noticeable difference" (jnd), is the smallest physical difference between two stimulus conditions that a person can detect. According to Weber's law, the jnd for each sensory modality is equal to a percentage of the first stimulus, and the percentage holds constant regardless of the magnitude of the first stimulus.

While the jnd of photopic vision in humans is approximately 0.017, the jnd is approximately 0.143 for pressure applied to skin, and approximately 0.140 for vibrotactile stimulation (with slight variation based on frequency). Thus, while a visual stimulus need only change by 1.7% to be detectable, a vibratory stimulus must change by 14% to be reliably detected. Also, tactile senses modalities will have resolution characteristics (i.e., distance between two tactile features that can be perceived by a user) which are more coarse than the resolution provided by the sense of sight. Therefore, since touch is comparatively much less sensitive than is vision in humans, a challenge is naturally presented in designing tactile output systems that can generate outputs that may be unambiguously perceived by users.

The various embodiments account for the unique characteristics of the sense of touch by formatting specific types of information into localized units that may be easily understood by users through tactile perception. Specifically, the various embodiments may use comparative or relative information presentation forms rather than absolute information forms typically employed in visual displays. For example, the embodiments may present information on tactile output surfaces in the form blocks or bars which communicate relative magnitude information in terms of the size of blocks or length of bars. Analogous to the transfer of metadata for data content, information that may be presented to users via tactile output surfaces may communicate a property of a data set, in contrast to visual displays which would display the information itself. According to an exemplary embodiment, a mobile device may be configured to obtain information of interest to a user, format it consistent with a tactile output surface, and communicate it to the user through appropriate actuation of the tactile output surface. Such information may be within the mobile device itself or obtained via a network connection, such as via the Internet.

In the various embodiments, tactile output surfaces may be implemented in mobile devices using a variety of different technologies that create surface contours (e.g., bumps or ridges) that may be felt, or apply forces, vibration or electrostatic charges to the skin that can be felt. Examples of tactile and haptic technologies include, but are not limited to: actuators that can raise a portion of the surface to create a peak, bump, ridge or other raise shape; fluidic actuators that can raise a blister or other shape in response to pressure of a fluid in the surface being increased; piezoelectric actuators that may change shape or vibrate in response to an applied electrical signal; capacitive surfaces that can apply an electrostatic potential to the surface that can be sensed; electroactive polymers that may change shape or vibrate when actuated by an electrical signal; electrostatic actuators; thermal output circuits (e.g., resistive heaters or thermoelectric chiller circuit elements), to name just a few.

One embodiment of a tactile output surface uses physical actuators to raise perceivable portions of a surface (i.e., portions of a surface large enough to be felt by a user's fingers). A number of known types of actuator technologies may be used in such surfaces, some examples of which are described below with reference to FIGS. 8A-10B.

In another embodiment, a tactile output surface may be configured using electrostatic technology, such as the E-Sense™ technology developed by Senseg (Helsinki, Finland). The E-Sense™ technology uses a positively charged membrane that can be layered over a liquid crystal display (LCD) or other surface (e.g., sides and/or back) of a mobile device. The E-Sense™ technology membrane utilizes Coulomb forces to "tug" on human skin, which is typically negatively charged, in order to produce a tactile sensation. Currently the E-Sense™ technology is able to create ten tixels within a 3 inch×4 inch output surface, and higher resolutions may be developed in the future. However, this is but one haptic technology that may be used in the various embodiments.

Another example haptic technology that may be used in the various embodiments involves generating small vibrations by localized vibration generators, such as piezoelectric crystals that may be integrated into the surface of a mobile device. By individually energizing such piezoelectric elements with an alternating current or signal of an appropriate frequency, small vibration dots or "vixels" may be generated that users may sense with their finger tips. As mentioned above, the frequency of the signal applied to such piezoelectric vibration may be between about 10 Hz and about 1000 Hz.

As mentioned above, the sense of temperature may also be used in a tactile output surface. However, the resolution of the thermal sense of touch may not enable fine resolution thermal output surfaces. For this reason, thermal elements may be included as an auxiliary or augmenting sensation that is combined with other types of tactile or haptic technologies.

In various embodiments, a tactile output surface may be configured as a two-dimensional array of tactile units, such as moveable bump features, vibrators, electrostatic features, etc. that are individually actuatable by a processor. Each individually actuatable tactile element may be referred to and processed as a "tixel" or "vixel." A tixel array may contain of any number of tixels controlled by a processor. In the various embodiments, a processor may individually activate each tixel, analogous to the individual activation of pixels in a raster image.

Similar to how pixel size and pixel density define the resolution of visual displays, the size and spacing of individual tactile elements (or tixels) defines the "resolution" of a tactile output surface, which is the inter-element distance or number of elements per inch that a user can distinguish. The resolution of a tactile output surface will typically be limited by the resolving ability of the sense of touch modality of the tactile element (e.g., raised surfaces, vibration, electrostatic forces, etc.), as well as physical limitations imposed by the mechanism used in the tactile element. The sense of touch associated with feeling surface features, such as bumps, is typically on the order of a millimeter or so. The Marburg Medium Braille Specification requires that Braille dots have a diameter of 1.6 mm (which implies a height of approximately 0.8 mm), and that the dots be spaced apart by 2.5 mm from dot center to dot center, with the inter-character spacing set at 6.0 mm. The American Braille Technical specifications require that dots be 0.020 inches in height, and 0.09 inches apart with an inter-character spacing of 0.240 inches. Thus, a tactile output surface based on raised bumps will likely have a resolution no better than about 1.6 mm or 0.09 inches, or about 11 dots per inch (DPI) based only on the sense of touch. The resolution of the tactile output surface may be less than that if the mechanisms used to raise such bumps cannot be placed within 0.09 inches of each other. Since the haptic perception of vibration may require a larger area to be perceived (i.e., a larger vibrating dot), vibrating tactile output surfaces may have lower resolution capabilities. As mentioned above, the E-Sense™ technology currently has a resolution that enables ten tixels within a 3 inch×4 inch output surface.

Each tixel may have its own address that the processor uses to actuate it. For example, the address for each tixel may correspond to its coordinates within the tixel array. A processor outputting information to a user on a tactile output surface may assign to each tixel a value that is dependent upon on the information to be presented to the user. In an example embodiment, an individual tixel may have assigned a value of either "on" or "off", creating a 1-bit per tixel "tixmap". The tixmap may be stored in a tactile output buffer similar to a display buffer used for generating images on a visual display.

In some embodiments, individual tactile elements may be capable of more than one output setting (similar to how pixels may vary in brightness and color). For example, a tactile element based on an actuator, piezoelectric crystal or electroactive polymer may be able to generate raised "bumps" with a range of heights. In an embodiment, a processor may control the height of such tactile elements by assigning a value to the tixel that corresponds to the relative height to which the element should be raised. Thus, the data in the tactile output buffer may indicate both whether a tactile element is to be actuated and the degree or magnitude of the actuation.

In a further embodiment, multiple types of tactile modalities may be implemented on a given tixel, such as elevation and vibration (e.g., by applying an alternating current with a bias to a piezoelectric element), elevation and electrostatic, elevation and thermal, vibration and electrostatic, vibration and thermal, and electrostatic and thermal. In such embodiments, the data in the tactile output buffer may indicate actuation of a tactile element, plus the specific modality and magnitude to be implemented.

In order to output tactile information on a tixel array, a processor or dedicated tactile output circuitry may read the values stored in a tactile output buffer for each tixel address and send actuation signals to each tactile element accordingly. The processor or tactile output circuitry may generate activation signals, such as corresponding to an "on" value for selected tixels within the tixel array. In this manner, multiple activated tixels within a tixel array may be activated to create a variety of shapes of different sizes on a tactile output surface.

In various embodiments, multiple tixels may be activated in patterns or groups on a tactile output surface to communicate information to a user. Users may perceive the information by feeling the tactile characteristic (e.g., shape, size, etc.) of the activated portions of the tactile output surface. By correlating the dimensions, shapes and other characteristic to the information to be communicated, relatively sophisticated information can be communicated to users. In an example embodiment illustrated in some of the figures, the tactile characteristics used to communicate may be the length of the activated portion of the tactile output surface (the "haptic activation area") relative to the dimensions of the tactile output surface. The haptic activation length may correspond, for example, to relative magnitude information. Thus, if half of the tactile output surface is activated, a user would understand the magnitude of the indicated value is approximately 50 percent or about half of the maximum value indicated by the full length of the surface. In this manner, a dimension of the activated portion may communicate relative magnitude information to the user. Provided the user knows the meaning of the full length of the output surface, such a relative indication can provide very useful information in an easily perceived manner. Other example tactile characteristics that may be used to communicate relative magnitude information may include, but are not limited to, area, shape, width, and orientation of the haptic activation area.

Some illustrative examples of relative magnitude information that may presented to users in various use cases include, but are not limited to: the relative number of unread emails when the data set is the content of a folder in an email account; the number of new voicemails when the data set is the content of a voice mailbox; the amount time remaining until an event when the data set is information in an electronic personal organizer or calendar; and distance or time until a location is reached when the data set is the device's current geographic location. Relative magnitude information presented on a tactile output surface may also be associated with a status of the mobile device, for example, the amount of remaining battery charge, the cellular signal or wireless signal strength, etc.

Figure 1B:
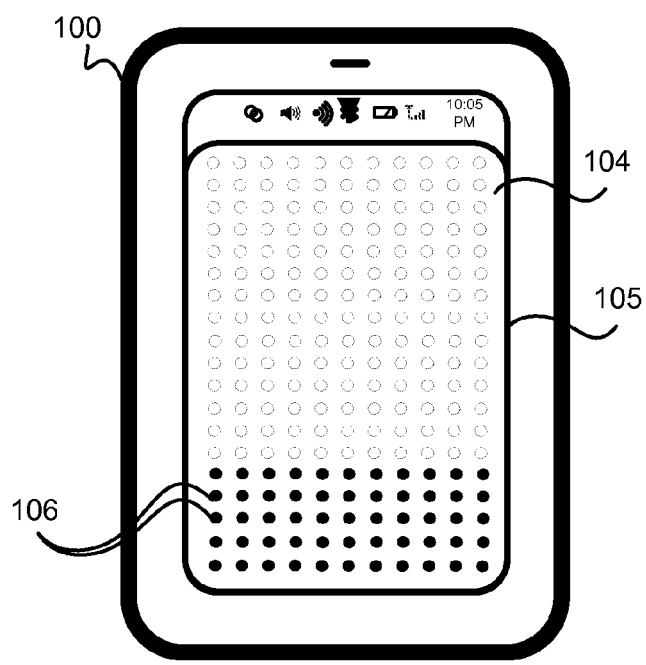
FIG. 1B is a frontal view of a mobile device illustrating activated tactile units on a tactile output surface according to an embodiment.

FIG. 1A illustrates an example embodiment implemented in a mobile device 100. In the illustrated embodiment, a plurality of tixels 102 is configured in a two-dimensional tixel array tactile output surface 104 configured on a display 105 of the mobile device 100. As mentioned above, in such a tactile output surface 104, each tixel 102 may be individually activated by a processor of the mobile device 100, to create a tactically sensible output. For example, FIG. 1B illustrates the tactile output surface 104 on a surface of the mobile device 100 with a plurality of inactivated tixels 102 and a plurality of activated tixels 106.

Figure 1C:
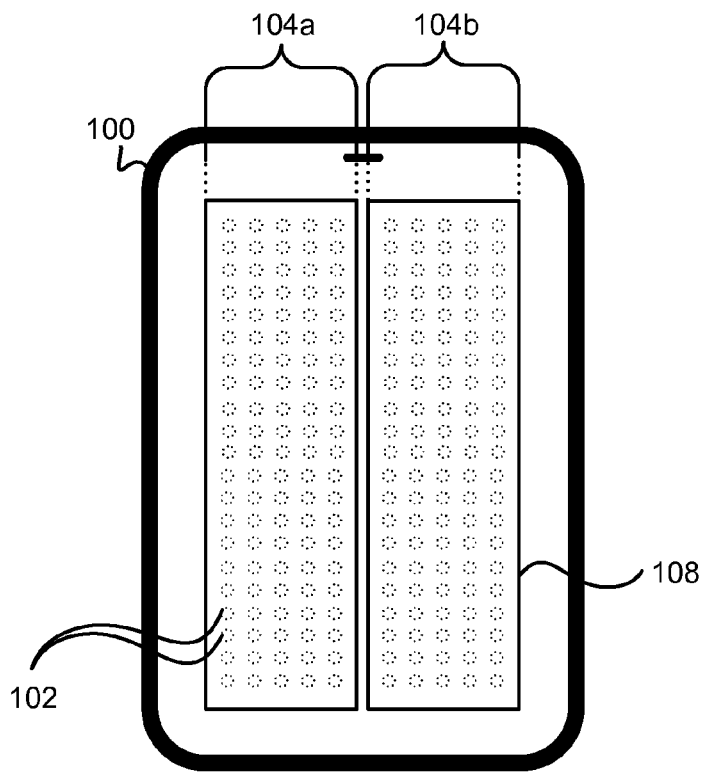
FIG. 1C is a frontal view of a mobile device illustrating two tactile output surfaces surrounded by grooved borders according to an embodiment.
Figure 1D:
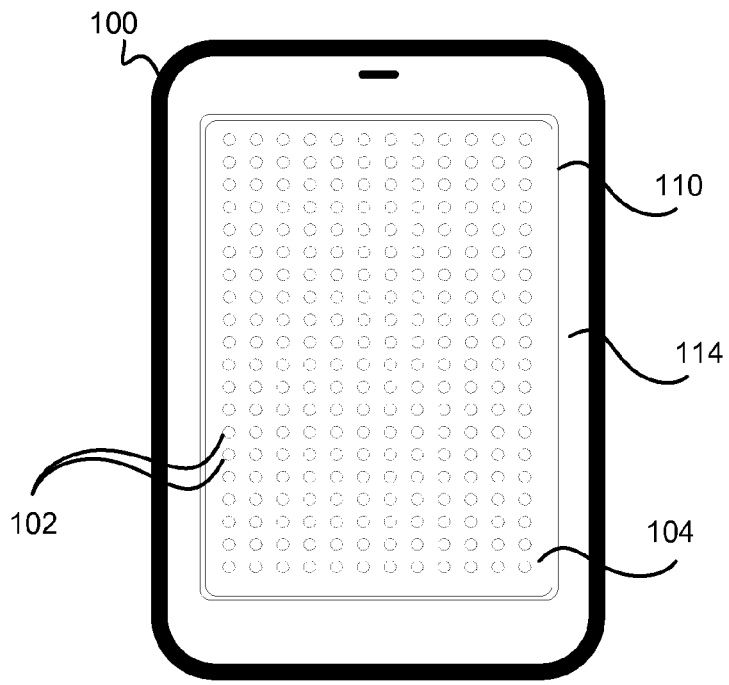
FIG. 1D is a frontal view of a mobile device illustrating one tactile output surface surrounded by a ridged border according to an embodiment.

A mobile device 100 may be configured with one or more tactile output surfaces on the back surface of the mobile device 100, as is illustrated in FIGS. 1C and 1D. As previously discussed, a characteristic of the activated portion of the tactile output surface (e.g., length/height), in comparison to the entire tactile output surface, may communicate relative magnitude information to a user. Tactile perception of a relative size characteristic may require a user to have the ability to readily determine the physical borders of the tactile output surface. Where a border of the tactile output surface aligns with the border of, for example, a display on the mobile device, a user may easily feel the physical boundary.

However, where the tactile output surface is implemented on another surface of the mobile device, such as the back surface, the only boundaries discernable by touch may be the edges of the mobile device. Accordingly, a mobile device may include tactile borders that enclose each tactile output surface, with the boarders formed by ridges or grooves. In an example embodiment illustrated in FIG. 1C, grooves 108 on surface 114 may surround tactile output surfaces 104 to provide tactile boundaries distinguishing each region of tactile output surfaces. In another example embodiment illustrated in FIG. 1D, a tactile boundary may be ridge 110 surrounding the tactile output surface 104. Grooves 108 and ridges 110 are merely two examples of embodiment tactile borders that may be provided on the mobile device 100.

In an embodiment, a user may make an input to a mobile device to initiate a function that obtains data and provides the user with requested information via a tactile output surface. The mobile device may recognize a user input, and determine from the type or pattern of the input a function to be performed or a type of information to be obtained and presented to the user. User inputs may be configured to enable the user to unambiguously signal the mobile device without looking at it, such as in the form of a particular button press, a tap or pat of the mobile device, moving the mobile device in a certain pattern or direction, holding the mobile device in a particular orientation with respect to the force of gravity, etc. Such user inputs may be sensed by accelerometers included in the mobile device and coupled to the processor.

In the various embodiments, a user input event may signal the mobile device to activate an application to obtain data from one or more sources and to present the obtained information a form compatible with the device's tactile output surface. The manner in which obtained information is presented on a tactile output surface may depend upon the type of data, user settings and the value or magnitude of values in the data. For example, the mobile device may determine, from settings stored in memory, the type of information to be presented on a tactile output surface for the application activated by the user input. Further the format for presenting data on a tactile output surface may be adjusted or specified in user settings, which may be entered via a user interface menu application.

The mobile device 100 may also be configured to request data from other devices and to present information associated with the received data set in a tactile output surface. This embodiment may enable users to obtain information from Internet websites, or mobile devices or computers accessible via the Internet, and present the information on the tactile output surface. For example, a parent may configure their mobile device to recognize a particular user input (e.g., a double tap) as a command to execute an application that accesses a website which tracks the location of their child's cell phone, requests the current location of their child, and then presents the data on a tactile output surface in the form of a haptic activation area. In this example, the mobile device may send a pull request to the child's mobile device or a server in communication with that device by communicating through a cellular data network (e.g., by sending an SMS message or making a data call to an Internet access server). The child's mobile device may respond by sending its own GPS coordinates, or by sending its current distance from a fixed pre-set destination, such as distance from home. Distance information received by the mobile device may be converted to a relative magnitude, such as a percentage of a preset distance that corresponds to the full length of a tactile output surface. Thus, if the received information is 5 miles, and the preset distance corresponding to 100 percent of the tactile output surface is 10 miles, the half of the tactile output surface may be activated to convey this information to the user. A mobile device configured with a tactile output surface comprising an array of individually actuatable bumps (like a Braille array) could present the location information in the form of a map of dots that a person may comprehend by feeling the surface.

Further, a mobile device may be configured to update the obtained information and reflect changes in the information by updating the haptic activation area periodically. In an example embodiment, the mobile device 100 may maintain an active wireless link to the Internet, and the user may configure the mobile device 100 to automatically refresh one or more of the downloaded data sets on a preset period so that the haptic activation area reflects the updated data. Refreshing data may be accomplished, for example, by the mobile device requesting a new data packet. The new data packet may contain data previously sent as well as new data acquired over the time interval.

To enable representation of numerical information on a tactile output surface 204, the mobile device 100 may apply a scaling factor to the information. The mobile device 100 may be further configured to transform the scaled information into signals to activated particular tactile unit according to present the scaled information on the tactile output surface. Tactile units with an "on" value in a tactile output surface 204 constitute the haptic activation area.

Similar to a representative fraction shown in a map legend, a value for each set of information may be scaled to a "tixel ratio" to enable representation on a tactile output surface. In one example embodiment, a maximum value for tactile representation may be pre-set for each tactile output surface (for example, the numerical value corresponding to activation of all tixels), and the tixel ratio may be stored in memory of the mobile device. In an alternative embodiment, a percentage scale factor for each tactile output surface may be pre-set and stored in memory of the mobile device. In applying the percentage scale factor to a set of information, the mobile device may compute an optimum tixel ratio with which to present the information on the tactile output surface.

Figure 2A:
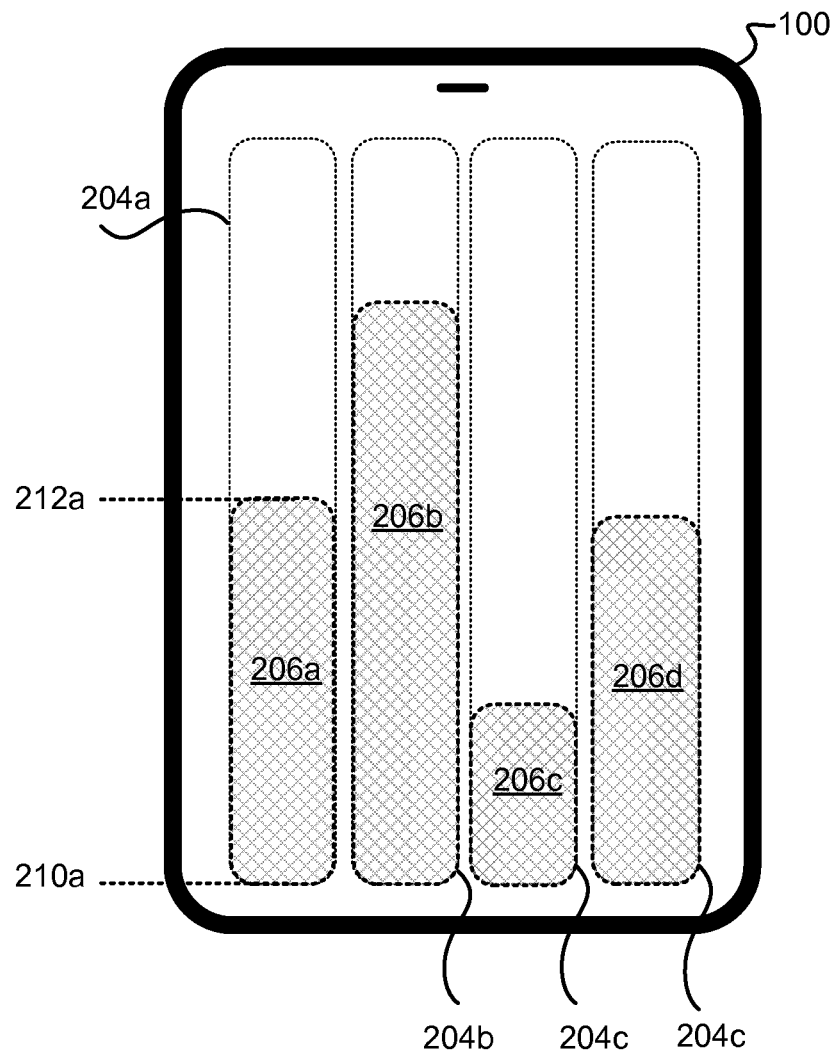
FIG. 2A is a frontal view of a mobile device illustrating activation of four tactile output surfaces according to an embodiment.

Depending on the size of the device surfaces and on the resolution provided by the tactile technologies, a mobile device may be capable of presenting more than one tactile output surfaces. FIG. 2A illustrates an example embodiment mobile device 100 configured with four tactile output surfaces 204a, 204b, 204c and 204d on a back surface of the device. For example, the lengths of haptic activation areas 206a, 206b, 206c, 206d may represent four sets of relative magnitude information, which may be associated with the same or different data sets. The length of a haptic activation area 206a may be measured as the distance from a bottom margin 210a to top portion 212a, with this distance comparable by a user to the full length of each tactile output surface 204a, 204b, 204c and 204d. In this manner, relative magnitude information may be represented in the length of the haptic activation area 206a in comparison to the length of the entire tactile output surface 204a. Since the user can easily feel how much of the surface is raised or activated, the user can quickly comprehend the relative magnitude information being presented without having to look at the mobile device. For ease of reference, such linear tactile output surfaces are referred to herein as "progress bars" because the length of the haptic activation area 206a can easily communicate relative information, such as current progress towards a goal, objective, limit or other value represented by the length of the tactile output surface. However, the information conveyed by progress bars is not limited to a progress or progression value.

As an illustrative example, a tactile output surface 204a may be configured to communicate to a user the number of new text messages in the user's inbox. Referring to the first tactile output surface 204a shown in FIG. 2A, a characteristic such as the length of haptic activation area 206a may represent the number of new text messages in the user's inbox, for example. For example, the tactile output surface 204a may be configured such that the length of the corresponding haptic activation area corresponds to the range of 0-20 messages. Thus, if no portion of the tactile output surface is activated this may inform the user that there are no messages in the inbox, while if the activated area extends to the top of the tactile output surface 204a this may inform the user that there are 20 new messages in the inbox. So, the relative magnitude information (i.e., number of new text messages in this example) represented by the haptic activation area 206a shown in FIG. 2A would inform the user that there are approximately 10 (9-11) new text messages. Examples of different types of relative magnitude information are discussed in further detail below, with respect to FIGS. 7A and 7B.

Figure 2B:
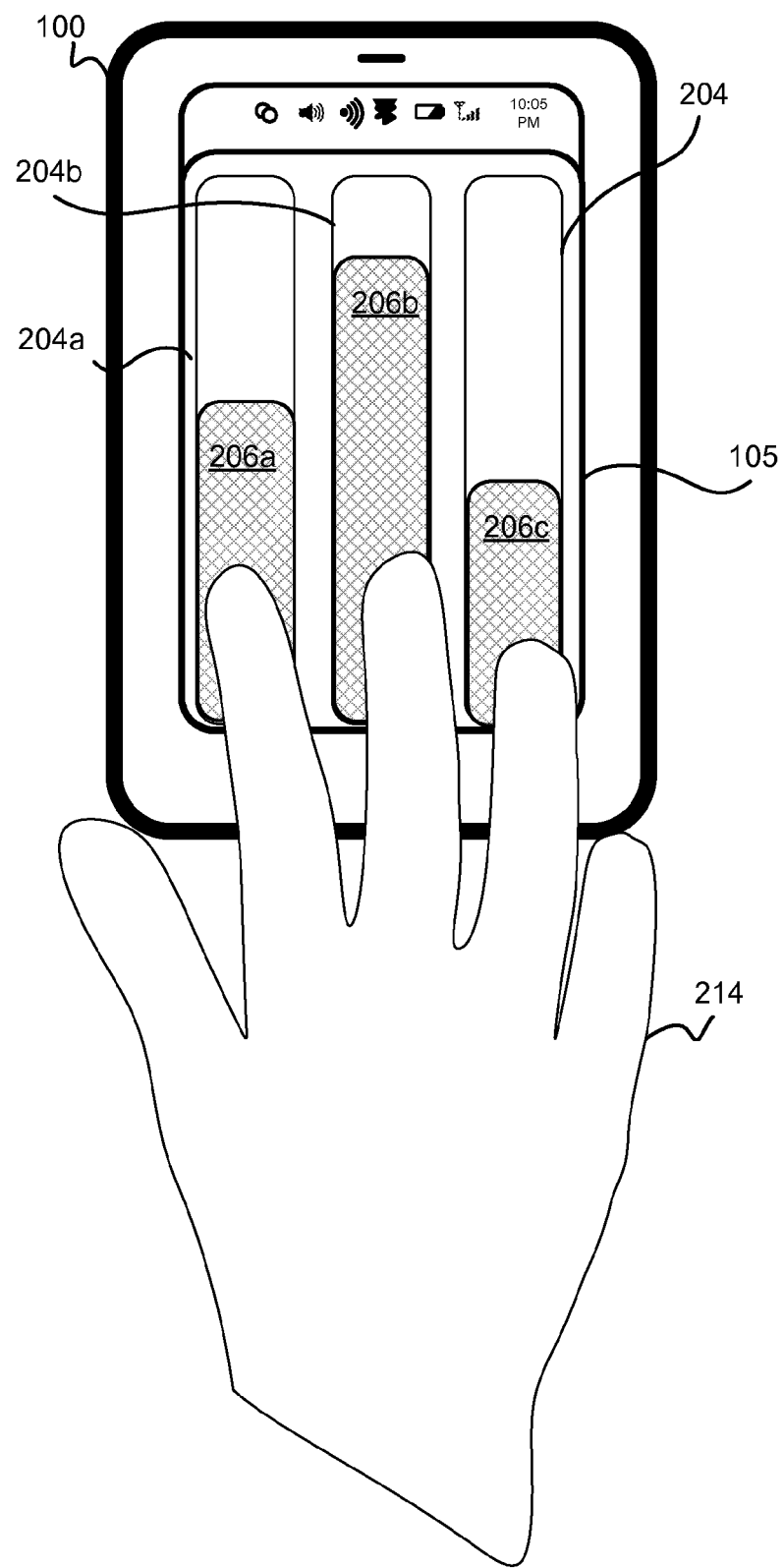
FIG. 2B is a frontal view of a mobile device illustrating user interaction with three tactile output surfaces according to an embodiment.

FIG. 2B illustrates a user receiving information from the tactile output surfaces 204a, 204b, 204c on a mobile device 100 by placing fingers 214 on the progress bar surfaces and moving fingers 214 along the lengths of the haptic activation areas 206a, 206b, 206c. In an example embodiment, from the lengths of the tactile output surfaces 204a, 204b, 204c and noting the extent of the haptic activation areas 206a, 206b, 206c relative to the length tactile output surfaces or progress bars 204a, 204b, 204c, the user may perceive relative magnitude information. FIG. 2B also illustrates an embodiment featuring three progress bars 204a, 204b, 204c, in contrast to the embodiment illustrated in FIG. 2A which features four progress bars 204a, 204b, 204c and 204d.

FIG. 2B also illustrates an embodiment in which the tactile output surfaces 204a, 204b, 204c are positioned on the display 105 of the mobile device 100. As mentioned above, this type of tactile output surface to provide a dual mode display (i.e., visual and tactile display) may be possible using the E-Sense™ technology which can be implemented over an LCD or similar display.

In embodiments in which numerical information that has no natural upper limit is to be presented to a user, representation of relative magnitude on a tactile output surface may be enabled by assigning a given range of values to the bottom and top of each tactile output surface. In this manner, multiple adjacent tactile output surfaces (e.g., illustrated in FIGS. 2A and 2B) may be used to communicate numbers based on the percentage of the surface that is activated. For example, numbers between 0 and 999 could be presented in a base 10 format, by a first tactile output surface 204a representing units by the distance the haptic activation area 206a extends from the bottom (which represents 0) and the top (which represents 9), a second tactile output surface 204b representing tens by the distance the haptic activation area 206b extends from the bottom (which represents 10) and the top (which represents 90), and a third tactile output surface 204c representing hundreds by the distance the haptic activation area 206c extends from the bottom (which represents 100) and the top (which represents 900).

Figure 2C:
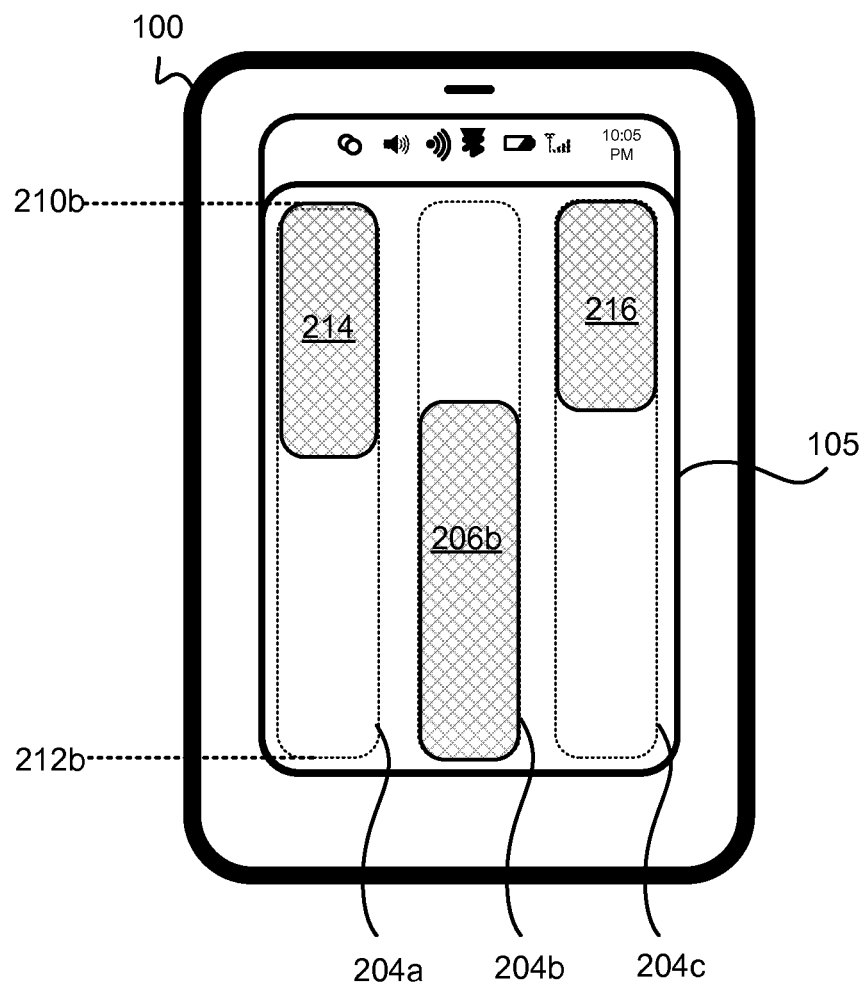
FIG. 2C is a frontal view of a mobile device illustrating two inverted orientation tactile activation areas on tactile output surfaces according to an embodiment.

In another embodiment, numbers greater than the range assigned to the length of a tactile output surface may be presented by reversing the orientation of the haptic activation area within the surface. Presenting haptic activation areas in an "upside down" orientation on the tactile output surface may communicate that the value is greater than the range encompassed by the surface in the normal orientation, so that the relative magnitude may with respect to a larger number range. FIG. 2C illustrates an example of an exemplary embodiment mobile device 100 with tactile output surfaces 204a and 204c presenting upside down haptic activation areas 214, 216. "Right side up" haptic activation area 206b may represent information that is within the number range assigned to the length of the surface. Upside down haptic activation areas 214, 216 may represent numerical information that exceeds the value represented by top point 212b.

Continuing with the previous example of a number of email messages within a user's inbox, a right side up haptic activation area 206b within a tactile output surface (e.g., surface 204b) may convey the number of new voicemail messages within a range of 0 at the bottom 212b to 20 at the top 210b, while an upside down haptic activation area 214, 216 may convey the number of email messages from 21 at the top 210b and 40 at the bottom 212b. In this manner, presenting upside down haptic activation areas on the tactile output surface may expand the range of information that may be represented on the tactile output surfaces 204 without compromising resolution. Thus, a single tactile output surface may present numerical information spanning twice that which is feasible given the resolution of the type of tactile element modalities.

In an alternative embodiment, an upside down haptic activation area 214, 216 may be used to represent information based on different units, a different scale factor, etc. In other alternative embodiments, properties other than orientation of the haptic activation areas (for example, shape, width, etc.) may be used to convey information in a different range.

Figure 3:
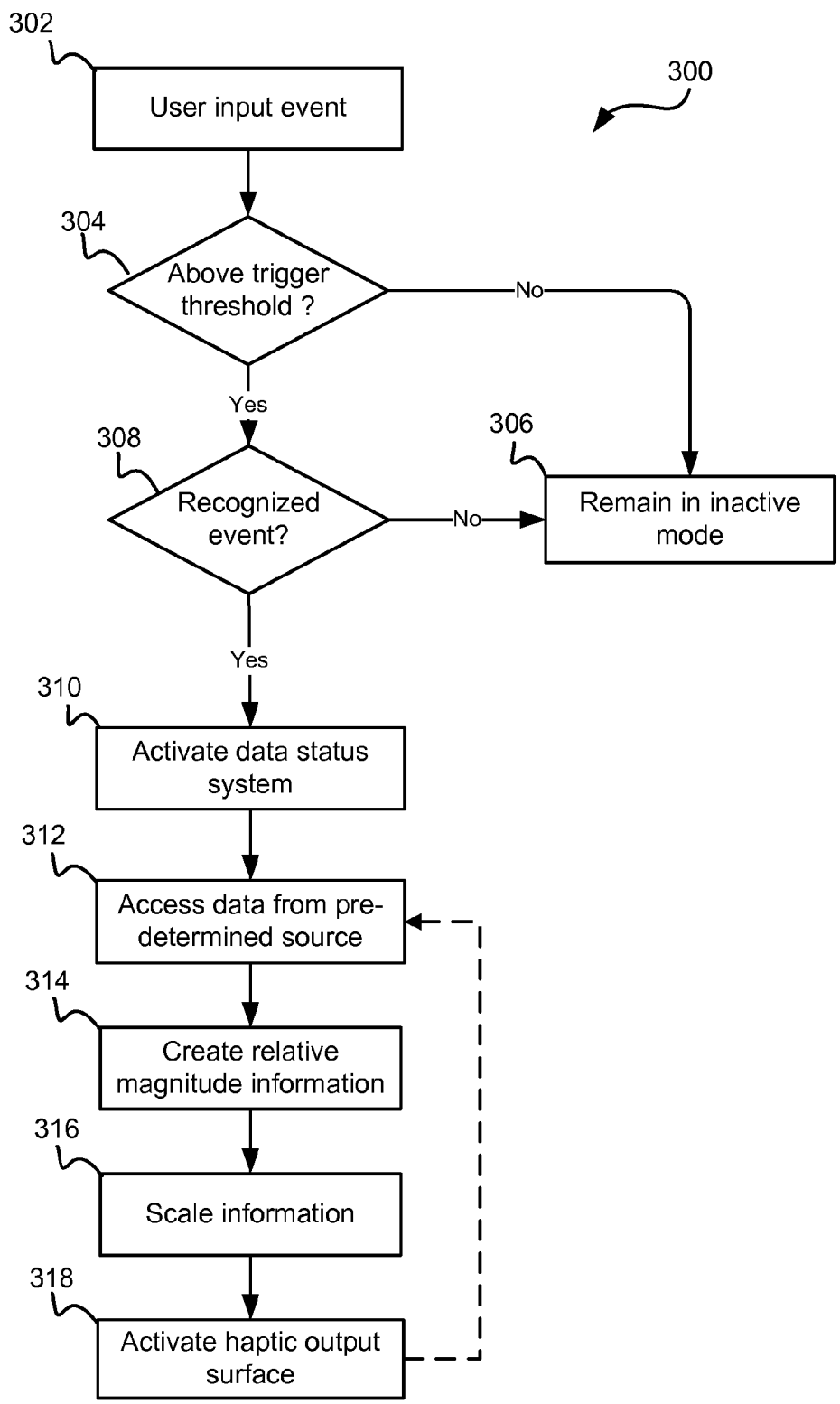
FIG. 3 is a process flow diagram illustrating an embodiment method for presenting information using tactile output surfaces.

FIG. 3 illustrates an embodiment method 300 for communicating information using a tactile output surface on a mobile device. When not in active use, the mobile device 100 may be in a low-power state with not tactile elements activated and the processor continuously "listening" for user inputs, such as a button press or recognizable accelerations that may indicate a tapping or shaking of the device by a user. At block 302 the mobile device detects a user input event (e.g., a key press, tilt in orientation, taps on a touchscreen, etc.) At determination block 304, the mobile device 100 may determine whether the detected event is above a threshold value. If the detected event is not above a threshold level (i.e., determination block 304="No"), the mobile device 100 may ignore the input and remain in the inactive state at block 306. This determination may protect against accidental activation, such as from jostling or dropping of the mobile device.

If the detected event is above the threshold level (i.e. determination block 304="Yes"), the mobile device may determine whether the detected event is a recognized user input event, at determination block 308. This determination may be with reference to a user's pre-programmed settings that may designate the type of input event(s) to be recognized as triggers for activating an application (such as an application to gather information to present the gathered information on a tactile output surface). If the detected event is not recognized as a user input event (i.e., determination block 308="No"), the mobile device 100 may ignore the event and remain in the low-power state at block 306. If the detected event is recognized by the mobile device as a user input event (i.e. determination block 308="Yes"), the mobile device may activate the application that is correlated or linked to the recognized user input at block 310. Any form of application may be activated in this manner, but for the sake of illustrating aspects of the various embodiments, the description of FIG. 3 continues presuming that the activated application is one that obtains data from a data source and then presents the obtained data in suitable format on a tactile output surface.

At block 312, the mobile device processor implementing the activated application may access data from a pre-selected source define for the application or that is associated with the recognized user input event. The data source may be internal, such as information stored in an internal memory, external, such a server accessed via a communication network, or an algorithm or calculation that is performed to generate the data, such as a calculation performed based upon information obtained from internal and/or external sources. Any conventional software and communication mechanism may be used to obtain the information.

At block 314, using the obtained data the mobile device processor may reformat or scale the obtained information, or generate a value or relative magnitude based upon the obtained information that is suitable for presentation on a tactile output surface. As described above, the course resolution of the tactile output surface may be better suited to presenting information in terms of relative magnitudes or levels within a given range. Therefore, the operations in block 314 may transform a wide variety of obtained information into such a relative format. At block 316, the mobile device processor may also scale the information to match the size, resolution or given range of values of a tactile output surface. Scaling processes are discussed in more detail below with reference to FIGS. 5A and 5B. At block 318, the mobile device processor may generate the signals that activate the tactile units on a tactile output surface to generate a pattern representative of the scaled information.

In various embodiments, user inputs may also be made through a touchscreen. Further, determining whether a user input event is above a threshold in determination block 304 may be performed in the same step as detecting a user input event. For example, in a mobile device 100 with a capacitive touchscreen, a user input event may be recognized based on a change in capacitance above a threshold amount resulting from a finger touching the surface, where the threshold for a user input event is also the trigger threshold in determination block 304.

Figure 4:
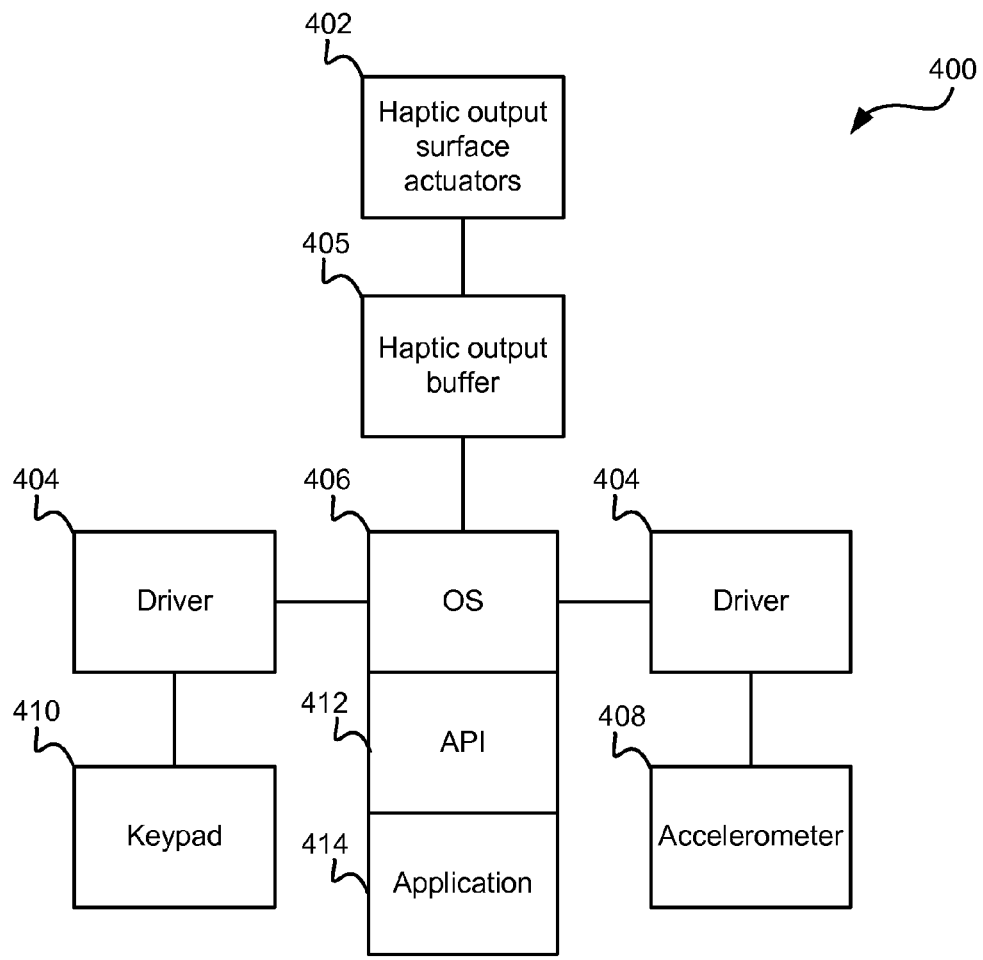
FIG. 4 is a hardware/software architecture diagram of a mobile device suitable for use with the various embodiments.

FIG. 4 illustrates a hardware and software architecture 400 of a mobile device 100 suitable for use with the various embodiments. A mobile device processor may configured with an operating system (OS) 406 that interfaces with application software 414, device drivers 404 and a tactile output buffer 405 which stores data that drives tactile output surface actuators 402. The processor may be programmed with an application 414 to that communicates information to a user via a tactile output surface. The application 414 may communicate with the operating system 406 through an application programming interface (API) 412. An API 412 is an interface that defines the ways by which an application program may request services from libraries and or the operating system 406. Alternatively, the tactile output surface functionality may be implemented in a series of new APIs with which an application may interface.

Users may communicate with the application 414 through, for example, a keypad 410 and/or an accelerometer 408, such as to activate the application or cause it to execute certain functions. The accelerometer 408 may be, for example, a three-axis accelerometer, and may further be coupled to various other sensors in the mobile device. Example user input events to activate an application include, but are not limited to, depressing a physical key, or touching a virtual key, on keypad 410, and moving the mobile device such that the change is detected by the accelerometer 408.

Information received through keypad 410 and/or accelerometer 408 may be communicated to the operating system 406 and via drivers 404. Drivers 404 translate information and commands between the keypad 410 and/or accelerometer 408, and the operating system 406. The information received via the drivers 404 may be communicated to the application 414 via an application programming interface 412. The application 414 may present information to users interfacing with the operating systems 406 to cause actuation of tactile output surface actuators 402, such as E-Sense™ elements, surface vibration elements, or surface actuators some examples of which are discussed in further detail below with reference to FIGS. 8A and 8B.

Figure 5A:
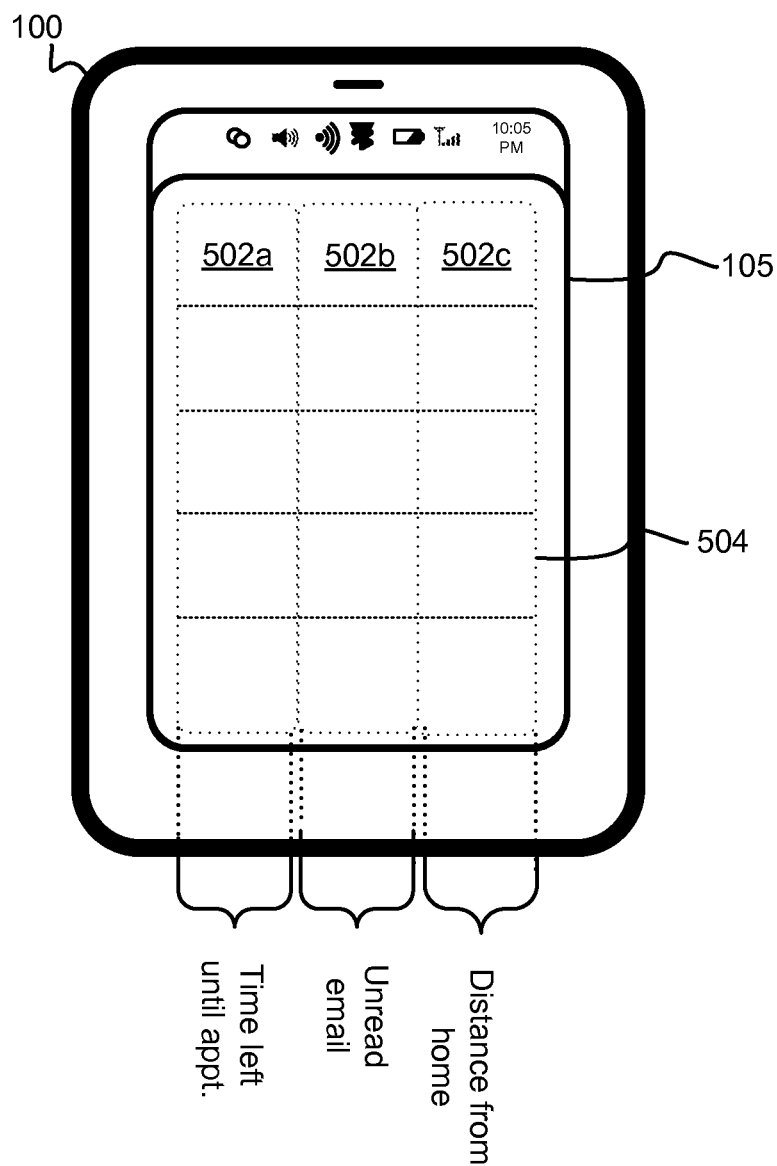
FIGS. 5A-5C are frontal views of a mobile device illustrating example tactile unit configurations according to the various embodiments.
Figure 5B:
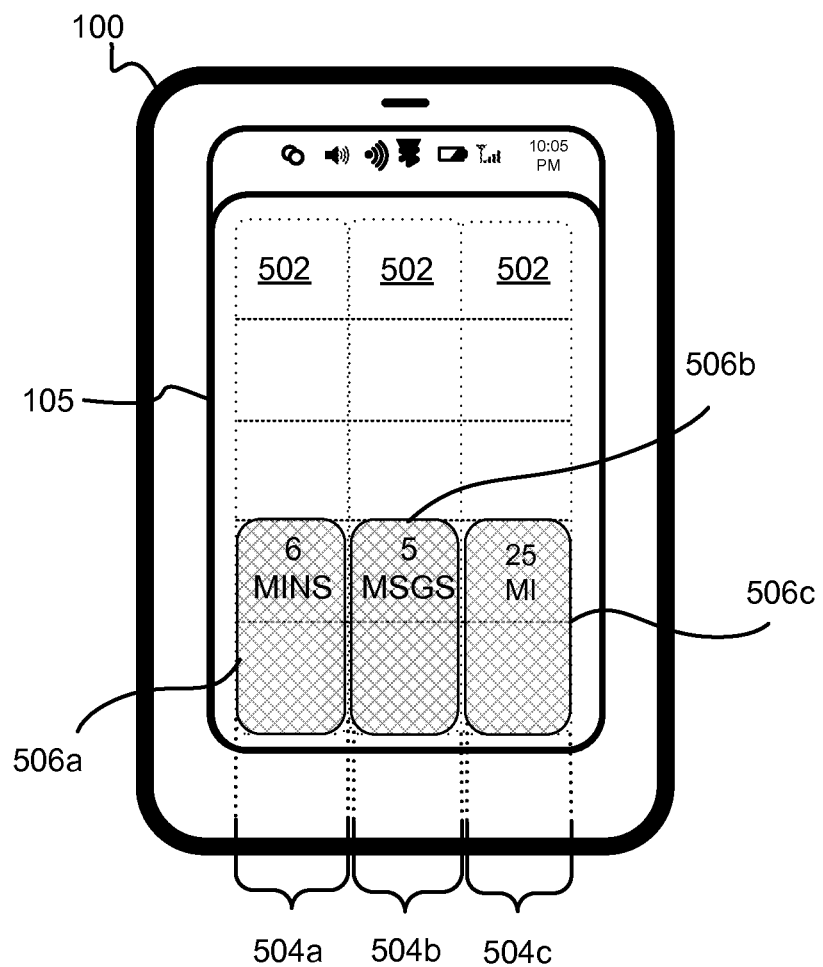
Figure 5C:
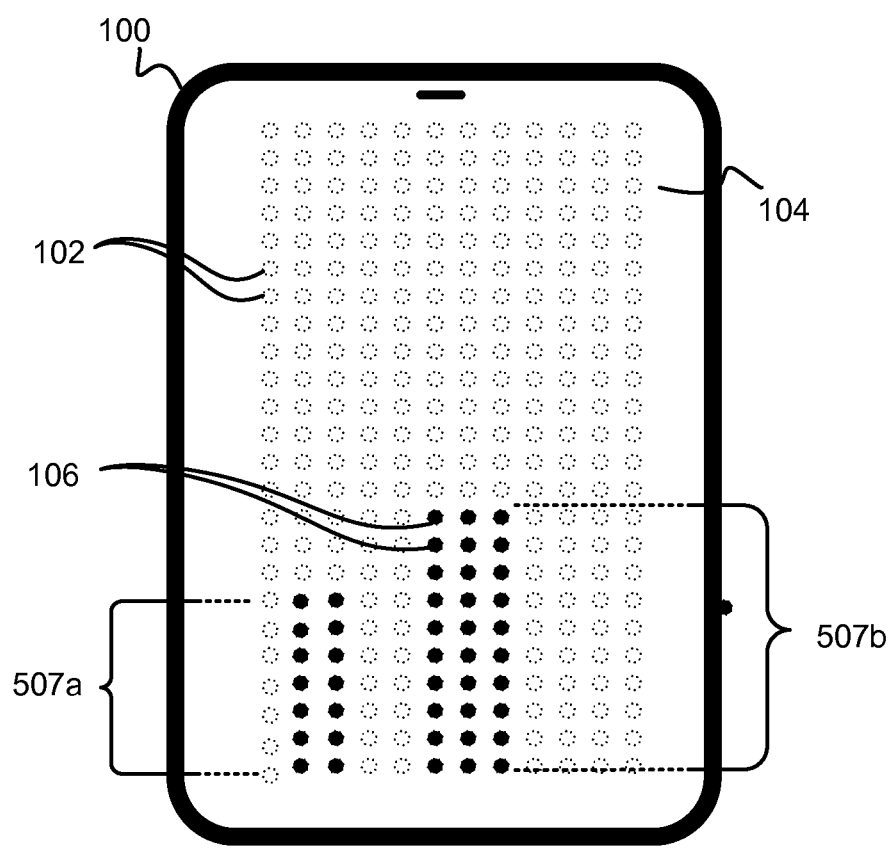

FIGS. 5A-5C illustrate an embodiment in which a tactile output surface 504 positioned on a display 104 is provided in the form of tactile units 502, such as E-Sense™ elements. FIG. 5A illustrates tactile units 502 in a grid of tixels configured to present three tactile output surface columns 504a, 504b, 504c. The tactile output surfaces 504a, 504b, 504c may used to present a variety of different numerical or relative magnitude values. In the illustrated example, the tactile output surface is in the form of a five row by three column two-dimensional grid of tixels 502.

FIG. 5B illustrates an example of activated tixel for sets of information associated with the three example tactile output surfaces shown in FIG. 5A. FIG. 5B also illustrates how different portions of a tactile output surface, such as adjacent columns, may communicate different types of information with different units and scaling factors. In the illustrated example: the left hand tactile output surface 504a is presenting time remaining until a next appointment, with each tixel 502 representing a three minute interval; the center tactile output surface 504b is presenting the number of unread emails in a user's inbox, with each tixel 502 corresponding to four email messages; and the right hand tactile output surface 504c is presenting distance from the user's home, with each tixel 502 corresponding to twelve miles. Thus, in this example the haptic activation areas 506a, 506b, 506c—each encompassing two tixels 502—inform the user that the next appointment is in six minutes, there are eight unread emails in the user's inbox, and that the user is currently 24 miles away from home, respectively.

FIG. 5C shows an alternative embodiment of an array of tactile units 102. A surface of the mobile device 100, such as the back surface as illustrated in FIG. 5C, may be configured with a single tactile output surface 104. Small, circular tactile units 102 may be arranged in a two-dimensional grid array on tactile output surface 104. By selectively activating tactile units 102 a device processor can form haptic activation areas in a variety of different shapes and sizes. For example, rectangular haptic activation areas 507a, 507b may represent two different sets of information. Such an array also allows more than one dimension of information to be conveyed by a haptic activation area, such as by varying width as well as the height of the activation area. For example, haptic activation area 507a is two tactile units 106 wide while haptic activation area 507b is three tactile units 106 wide. The width of the haptic activation areas 507a, 507b may be used to represent a variety of different types of information, such as a magnitude range, a measurement unit, a type of information, a level of urgency or importance, etc.

The type of information represented on a tactile output surface may be determined according to a number of different settings on the mobile device, including, but not limited to, user selections, factory settings, as defined by an application, etc. In an exemplary embodiment, the information may be pre-selected by users and stored in memory in the mobile device, such as in a user profile data file.

In an example embodiment, the mobile device may present users with a variety of different information types and may prompt the user to select a type to be represented on a tactile output surface of the mobile device. In another example embodiment, the mobile device may be configured to utilize more than one tactile output surface at a time, and may prompt the user to select a type of information to be presented on each tactile output surface. Further, the mobile device may include hardware enabling presentation of more than one type of tactile output surface. For example, the mobile device may display for the user a variety of tactile properties (e.g., "vibration", "warmth", "bump elevation", "roughness", etc.) and may prompt the user to select a property for each type of information that may be represented in a tactile output surface.

In various embodiments, the mobile device may be configured to determine the type of information to present to the user by referencing a user-configurable data table 600 that may be stored in memory, an example of which is illustrated in FIG. 6A. In such a data table 600, column 602 of data may list recognizable user input events, and a column 604 of data may list corresponding sets of information that are to be presented on a tactile output surface. In addition, the data table 600 may include values of associated parameters for generating a tactile representation of information, such as, for example, a representation range in column 606 and a ratio or value to be assigned to each tactile units (e.g., a tixel ratio) in column 608. In the illustrated example, the first row indicates that the mobile device recognize detect two taps (listed in column 602) as indicating that the information requested by the user, listed in column 604, is the number of new emails in the user's inbox. The data table 600 further identifies the range "0-20" in column 606 as the number of new emails to be represented by the length of the haptic activation area on a tactile output surface, with each activated tixel representing four new emails in the user's inbox, as listed in column 608.

As discussed above, more than one tactile output surface may be present on the surface of a mobile device, with each used to present information from different data sets. To support such an embodiment, a configuration data table 650 may include more data elements to specify factors associated with each data set, such as illustrated in FIG. 6B. For example, the data table 650 may be organized to list information or units, 604a, 604b, range 606a, 606b, and tixel ratio 608a, 608b, for each tactile output surface and for each type of user input event.

Figure 7A:
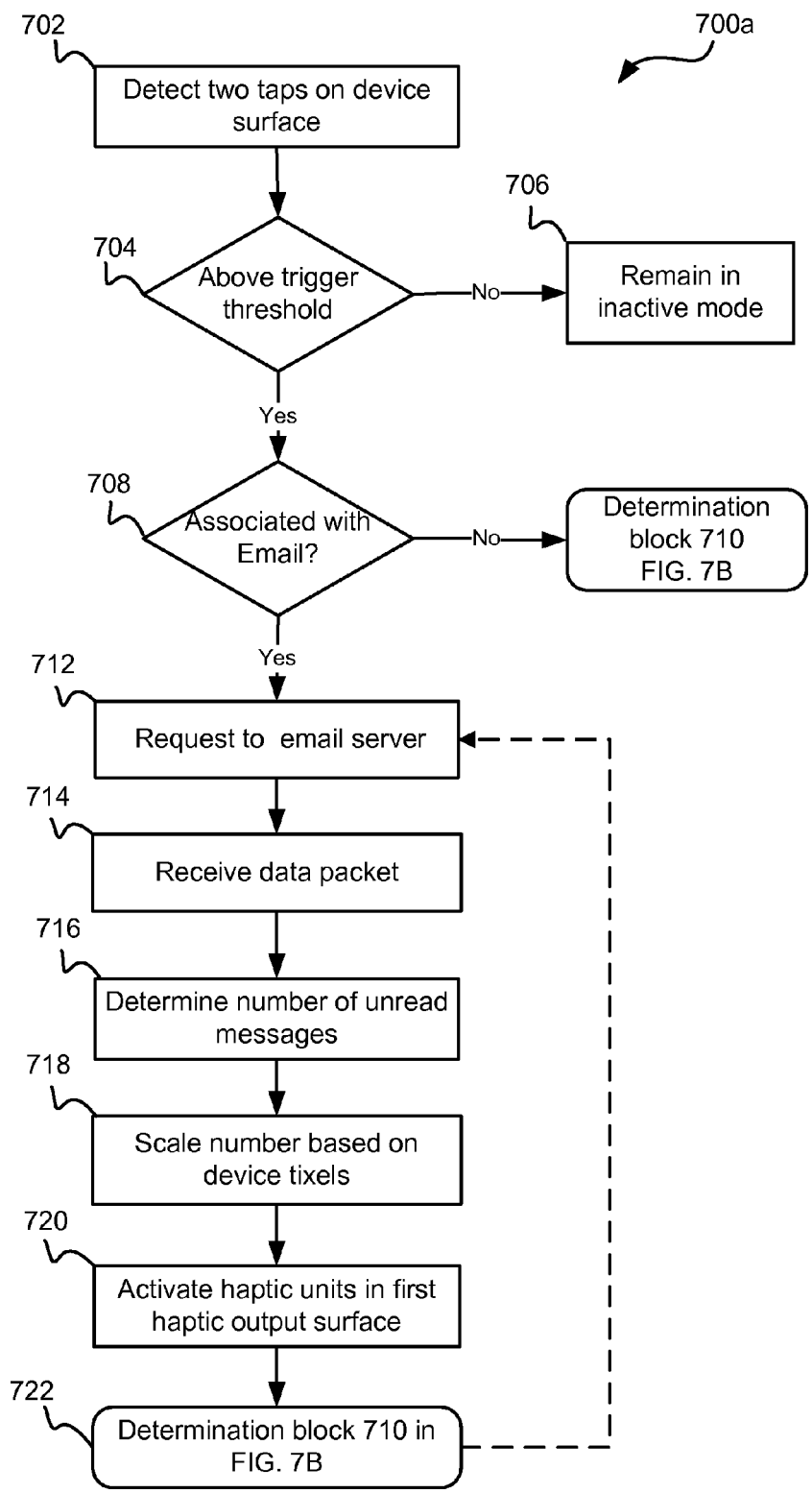
FIGS. 7A and 7B are process flow diagrams illustrating an embodiment method for presenting email information and location/distance information to a user on a tactile output surface.
Figure 7B:
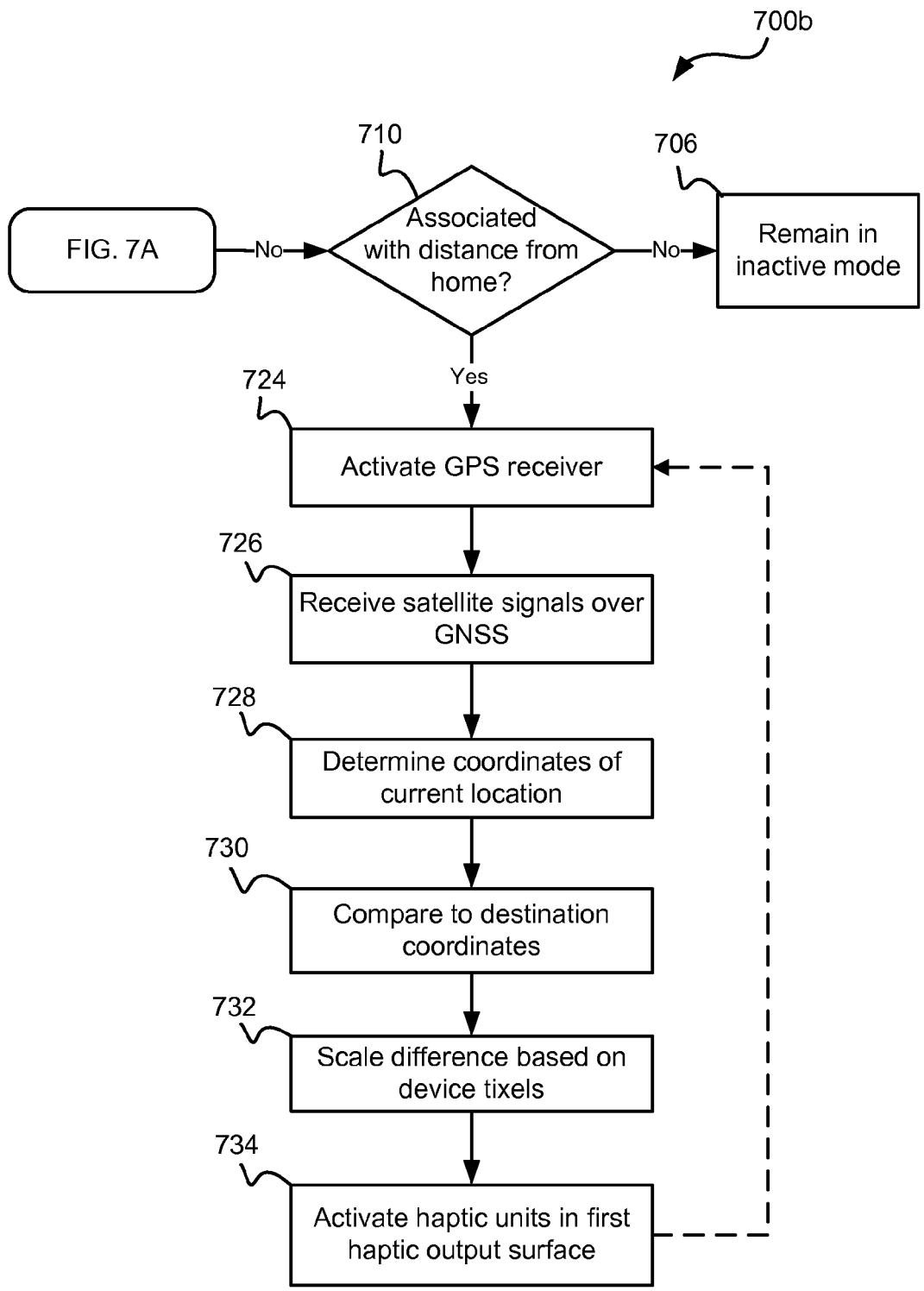

FIGS. 7A and 7B illustrate an example method 700 for an application that represents email number and distance information on two tactile output surfaces on a mobile device 100 in response to a user input event. At block 702, the mobile device processor may detect two taps on the device by processing data from accelerometers or a touchscreen. At determination block 704 the mobile device processor may determine whether the detected input (in this example taps) are above a pre-defined trigger threshold. This determination may be based on a surface pressure magnitude, minimum time duration, a minimum acceleration, etc. If the detected input is not above the trigger threshold (i.e., determination block 704="No"), the mobile device processor may ignore the event and remain in an inactive state. If the taps are above the trigger threshold (i.e., determination block 704="Yes"), the mobile device processor activate the application which may determine at determination block 708 whether the two tap gesture is a user input event associated with email information, such as a request for the number of unread email messages in the user's inbox. This determination may be made by referencing a data table, such as data table 600 or 650, shown in FIGS. 6A and 6B, respectively, to correlate the detected event to a function or application functionality. If the processor determines that the gesture is not a user input event associated with email information (i.e., determination block 708="No"), the application may continue to determination block 710, discussed below with reference to FIG. 7B.

If the processor recognizes that the user input event is associated with email information (i.e., determination block 708="Yes"), the processor may send a request for the pending messages in the "Inbox" to a designated email server in block 712. The email server address may be predefined by the user in a registration step. This request for information may be accomplished by the processor establishing a wireless communication link to the Internet via a wireless data network, and then sending an appropriate query message to the email server via the Internet. At block 714, the mobile device processor may receive and store in memory the data requested from the server. At block 716 the mobile device processor may determine from the received data the number of unread email messages. At block 718, the mobile device processor may scale the number of emails to fit the tactile output surface according to pre-defined settings, which may be user defined or modified. At block 720 the mobile device processor may activate tactile units to present a haptic activation area in a first tactile output surface that has a size and/or shape representing the scaled information regarding the number of emails in the user's inbox.

Turning to FIG. 7B, method 700 may continue at determination block 710 with the processor determining whether the user input event is associated with distance information, such as the distance from home. If the gesture is not a user event associated with distance information (i.e., determination block 710="No"), the mobile device may return to the default inactivated state. If the user input event is associated with distance information (i.e., determination block 710="Yes"), the mobile device may activate a Global Positioning System (GPS) receiver at block 724. The device's GPS receiver may receive radio signals from satellites at block 726, and calculate position information at block 728. At block 730 the mobile device processor may compare the location information received from the GPS receiver to a present location, such as the user's home, and calculate the distance between these two points. At block 732 the mobile device may scale the computed distance from home based on tixel units (i.e., the number of distance units corresponding to each tixel in the tactile output surfaced). At block 734 the mobile device may activate tixels accordingly to generate a haptic activation area in a second tactile output surface representing the distance information.

As discussed above, a variety of technologies may be used in tactile output surfaces. In an embodiment, the tactile output surface may be configured with tactile rendering technology to form virtual objects with different shapes, textures, etc.

Virtual objects may be created through forces generated by a tactile interface that manipulates forces and geometry in touch "illusions" based on how the human brain would perceive the information from a real object. This is analogous to the manner in which optical illusions may be created by manipulating the way humans' perceive visual information.

Figure 8A:
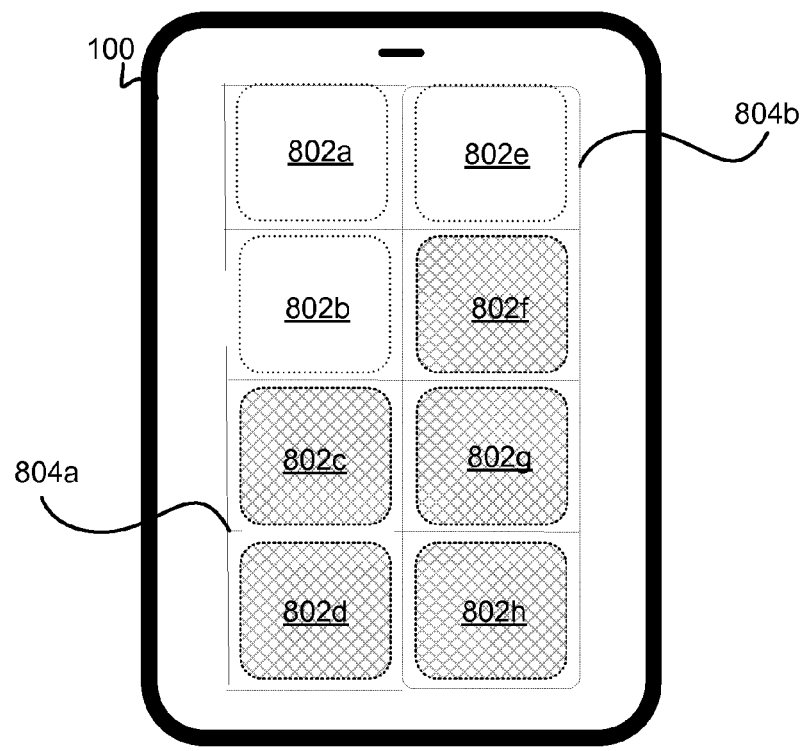
FIGS. 8A and 8B are frontal and elevation views illustrating tactile output surface that communication information by raising portions of the tactile output surface according to an embodiment.
Figure 8B:
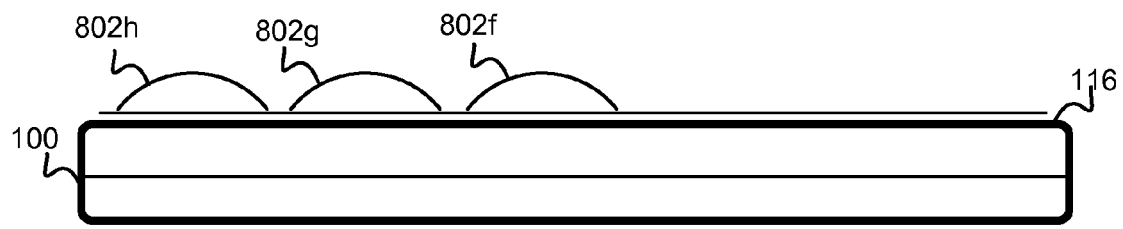

In another embodiment, tactile units may be raised/elevated from a tactile output surface when activated. FIG. 8A illustrates a mobile device 100 configured to represent information on a surface 116 with raised tactile units. Tactile units 802a-802d may form a first tactile output surface 804a, and tactile units 802e-802h may form a second tactile output surface 804b. In an example embodiment, raised tactile units 802 may be in the shape of buttons or keys when activated. As illustrated in FIG. 8B, the raised tactile units 802 may be dome-shaped. A variety of technologies may be used to raise the tactile units 802, including fluidic pressure, electrostatic pressure (see e.g., FIGS. 10A-10B), mechanical actuators (see e.g., FIGS. 9A-9D), piezoelectric actuators, electroactive polymers, etc. In an example embodiment, each tactile unit 802 may be formed from electroactive polymers which when activated by an electrical signal change shape, such as expanding in dimensions, causing the material to rise up in the manner illustrated. In another example embodiment, a fluid may be pumped into a blister formed by a flexible cover layer sealed around the edges of the tactile units. The mobile device processor may be configured to open and close valves connecting each blister to a fluid reservoir to enable the activation and deactivation of each tactile unit.

FIGS. 9A-9D illustrate an embodiment tactile unit that uses actuator mechanisms. Actuators which rely on piezoelectric elements may cause portions of a tactile output surface 804 to become raised when activated. The tactile units may be raised by a plurality of pins 906 individually driven by linear actuator motors 912. in this embodiment, a tactile element actuator 902 may include a pliable surface layer 904 which can be displaced vertically by an underlying pin 906 which is held in place laterally by parallel plates 908 and 910 and driven vertically by an actuator motor 912. The actuator motor 912 may be any suitable linear actuator, including linear piezoelectric actuators, solenoid actuators, linear motors, linear stepper motors, etc. Each actuator motor 912 may be driven by an individual electric signal, such as is delivered by a connector 914 which may be coupled to a processor within the mobile device. FIG. 9A illustrates the tactile element actuator 902 in the down or deenergized configuration. In this configuration, the pliable surface layer 904 lies flat. FIG. 9B illustrates the tactile element actuator 902 in the up or energized configuration, in which the pliable surface layer 904 is raised by pressure applied by the pin 906.

As shown in FIGS. 9C and 9D, a plurality of the tactile element actuators 902 may be closely spaced and configured as an array of tactile elements. Such a configuration may enable actuation of different portions of the pliable surface layer 904 in response to individual signals applied by the processor via connectors 914 in order to create haptic activation areas of different shapes and sizes. FIG. 9C illustrates a tactile output surface 804 without any tactile units activated, and accordingly none of the tactile element actuators 902 are energized. FIG. 9D illustrates the mobile device 100 in a mode in which information is represented on the surface by multiple raised tactile units, with a haptic activation area 920 formed by energized actuators 902. By organizing or configuring the tactile element actuators 902 to be individually energized and arranging them in an array, a wide variety of different shapes of tactile units can be generated.

In various embodiments, raised tactile units may be activated using piezoelectric mechanisms. Piezoelectric materials change shape (e.g., elongate) in the presence of an applied electric field. The piezoelectric elements may be coupled directly to a surface of the mobile device 100, or may be coupled to mechanical pins which contact the surface response to individual activation signals, such as to generate raised tactile units 902, as shown in FIGS. 9A and 9B. Electric fields used to actuate piezoelectric elements may be individually connected to the elements by a processor, such as through an interface of solid state switches that connect the elements to a voltage source. Multiple independently actuating piezoelectric elements can be controlled by a processor to generate any of a variety of raised surface shapes.

An example of a piezoelectric element that may be used in various embodiments is Macro Fiber Composite (MFC), manufactured and sold by Smart Material Corp. of Sarasota, Fla. The MFC comprises rectangular piezo-ceramic rods sandwiched between layers of adhesive and electroded polyimide film. This film contains interdigitated electrodes that transfer applied voltages directly to and from the ribbon shaped rods. This assembly enables in-plane poling, actuation, and sensing in a sealed, durable, ready-to-use package. When embedded in a surface or attached to flexible structures, the MFC can provide distributed solid-state deflection and vibration control or strain measurements.

Figure 10A:
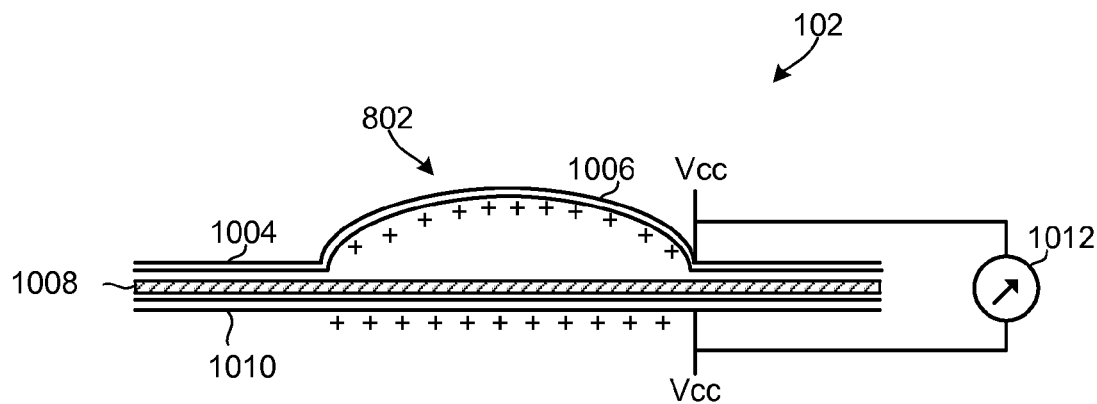
FIGS. 10A-10C are cross-sectional views of a tactile output surface in an embodiment actuated by electrostatic forces.
Figure 10B:
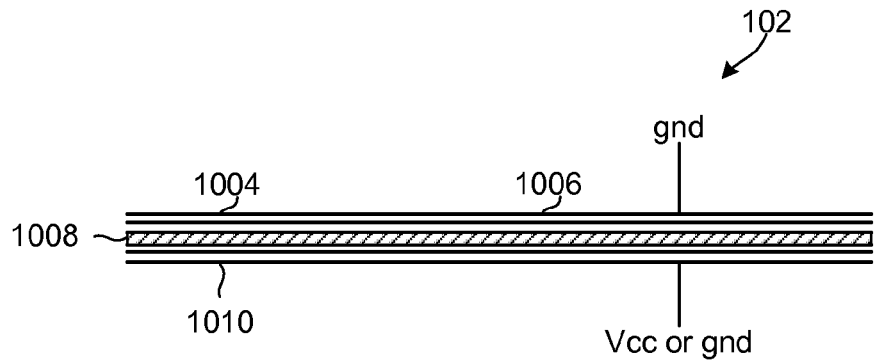

A further example of a tactile element mechanism utilizing electrostatic forces is illustrated in FIGS. 10A and 10B. In an example embodiment, the surface 1002 of mobile device 100 may include a top surface layer 1004 and a bottom support layer 1010 which may be selectively energized by a processor, such as applying a voltage (e.g., Vcc). If the top surface layer 1004 and bottom support layer 1010 are separated by an insulator layer 1008, charges applied to the top and bottom layers may result in electrostatic repulsive or attractive forces. By configuring the top surface layer 1004 with a pliable portion 1006, when the voltages of the same polarity are applied to both the top surface layer 1004 and bottom support layer 1010 as illustrated in FIG. 10A, the electrostatic forces may cause the pliable portion 1006 to raise above the rest of the top surface layer 1004, providing a raised tactile unit 1014 in a tactile output surface. As illustrated in FIG. 10B, the tactile unit 1014 may be retracted and the surface 1002 may return to being smooth by coupling one or both of the top surface layer 1004 and bottom support layer 1010 to ground, or by applying voltages of opposite polarities to the top surface layer 1004 and bottom support layer 1010.

Figure 10C:
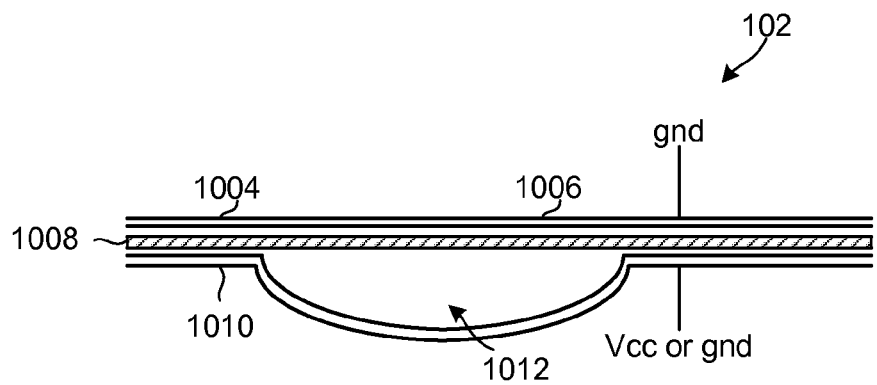

In another embodiment illustrated in FIG. 10C, the electrostatic mechanism illustrated in FIGS. 10A and 10B may be used to cause a surface depression (e.g., a dimple) in a portion of the surface rather than a raised portion. In this embodiment, the bottom surface support layer 1010 may be provided with a depressed or dimpled portion 1012. When voltages of opposite polarity are applied to the top surface layer 1004 and bottom support layer 1010, the top surface layer 1004 will be pulled towards the dimpled portion 1012 of the bottom surface support layer 1010, generating a dimpled portion in the top surface. Such a dimple in the top surface layer 1004 may be felt by a user running their finger over the surface.

In a further embodiment, the mechanisms illustrated in FIGS. 10A and 10C may be combined so that the top surface may have three tactile configurations, flat, raised and depressed.

Figure 11:
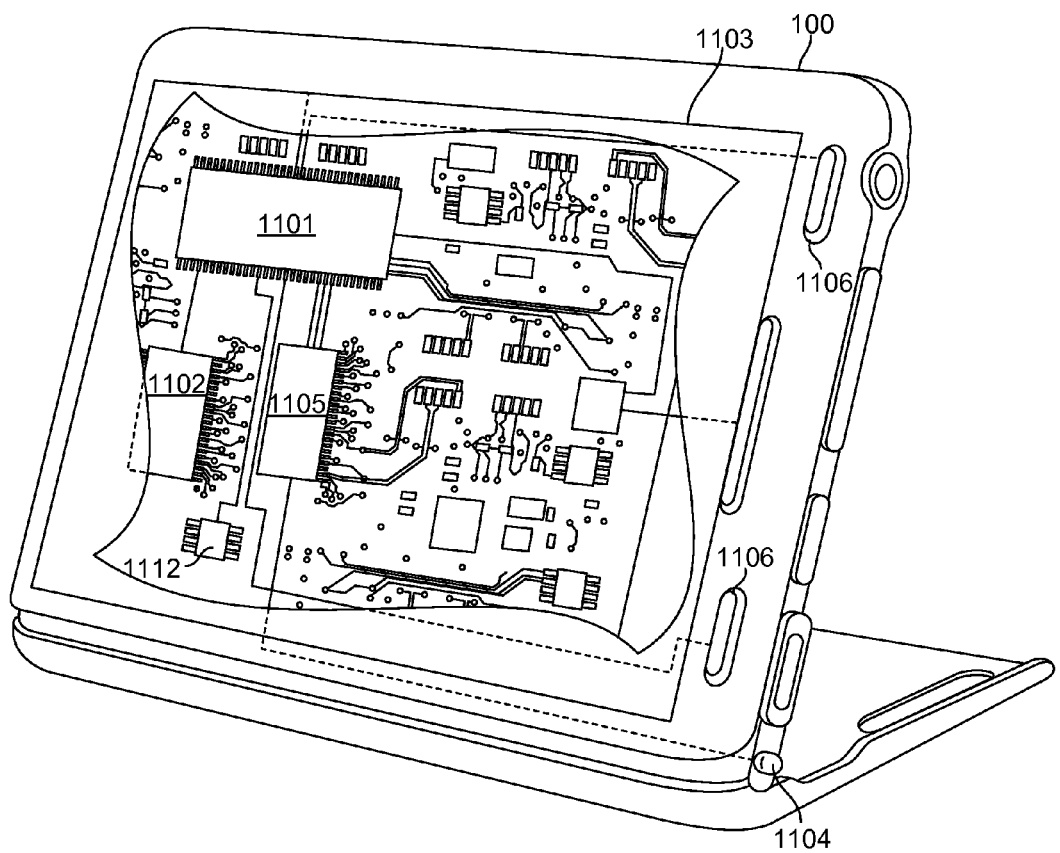
FIG. 11 is a component block diagram of an example portable device suitable for use with the various embodiments.

The embodiments may be implemented in a variety of mobile devices, particularly mobile computing devices. An example of a mobile device that may implement the various embodiments is a smart phone 1100 illustrated in FIG. 11. A multi-processor mobile device, such as a smart phone 1100, may include a processor 1101 coupled to memory 1102 and to a radio frequency data modem 1105. The modem 1105 may be coupled to an antenna 1104 for receiving and transmitting radio frequency signals. The smart phone 1100 may also include a display 1103, such as a touchscreen display. The mobile device may also include user input devices, such as buttons 1106, to receive user inputs. In the various embodiments the smart phone 1100 includes a tactile output surface, which may be positioned on the display 1103 (e.g., using E-Sense™ technology), on a back surface 1112, or another surface of the mobile device 1100.

The mobile device processor 1101 may be any programmable microprocessor, microcomputer or multiple processor chip or chips that can be configured by software instructions (applications) to perform a variety of functions, including the functions of the various embodiments described herein.

Typically, software applications may be stored in the internal memory 1102 before they are accessed and loaded into the processor 1101. In some mobile computing devices, additional memory chips (e.g., a Secure Data (SD) card) may be plugged into the mobile device and coupled to the processor 1101. The internal memory 1102 may be a volatile or non-volatile memory, such as flash memory, or a mixture of both. For the purposes of this description, a general reference to memory refers to all memory accessible by the processor 1101, including internal memory 1102, removable memory plugged into the mobile device, and memory within the processor 1101.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method of communicating information to a user on a mobile device, comprising:
   determining the information for communication to the user;
   formatting the information for presentation on a tactile output surface to generate formatted information indicative of relative magnitude information; and
   activating a localized portion of a tactile output surface to generate a haptic activation area corresponding to the formatted information, wherein the haptic activation area provides a tactile sensation to a user touching the tactile output surface, and wherein a relative size of the haptic activation area in comparison to a size of at least of portion of the tactile output surface is indicative of the relative magnitude information.

2. The method of claim 1, wherein determining the information to be communicated to the user comprises:
   accessing data from a data source; and
   processing the accessed data to generate information that is suitable for presentation on a tactile output surface.

3. The method of claim 1, wherein formatting the information for presentation on a tactile output surface comprises:
scaling the information to match a range assigned to the tactile output surface;
calculating a relative magnitude value by dividing the scaled information by the range assigned to the tactile output surface; and
using the calculated relative magnitude value as the formatted information.

4. The method of claim 1, wherein activating the tactile output surface to generate the haptic activation area corresponding to the formatted information comprises activating the tactile output surface to generate three progress bars.

5. The method of claim 4, wherein activating the tactile output surface to generate three progress bars comprise:
generating a first progress bar corresponding to first formatted information;
generating a second progress bar corresponding to second formatted information; and
generating a third progress bar corresponding to third formatted information.

6. The method of claim 1, wherein activating the tactile output surface to generate the haptic activation area corresponding to the formatted information comprises activating the tactile output surface to generate four progress bars.

7. The method of claim 6, wherein activating the tactile output surface to generate the four progress bars comprises:
generating a first progress bar corresponding to first formatted information;
generating a second progress bar corresponding to second formatted information;
generating a third progress bar corresponding to third formatted information; and
generating a fourth progress bar corresponding to fourth formatted information.

8. The method of claim 1, wherein activating the tactile output surface comprises activating at least one tactile unit that creates a tactile effect that can be felt by a user touching the tactile output surface.

9. The method of claim 8, wherein activating at least one tactile unit that creates a tactile effect that can be felt by a user comprises one or more of raising a portion of the surface, depressing a portion of the surface, changing a roughness of a portion of the surface, vibrating a portion of the surface, generating an electrostatic field than can be sensed in skin of the user, and changing a temperature of a portion of the surface.

10. The method of claim 1, wherein formatting the information comprises scaling the information according to a scale factor based on a range of the information and a size of the tactile output surface.

11. The method of claim 1, wherein formatting the information comprises dividing the information by a tactile unit ratio, wherein the tactile unit ratio is determined based on a range of the information and a size of the tactile output surface.

12. The method of claim 2, wherein the data source is defined by the user.

13. The method of claim 2, wherein the data source is one of an internal memory and a server accessible via a network.

14. The method of claim 1, further comprising:
detecting a user input;
activating an application based on the detected user input;
accessing data from a data source directed by the activated application; and
processing the accessed data as directed by the activated application to generate information that is suitable for presentation on the tactile output surface.

15. The method of claim 14, wherein activating an application based on the detected user input comprises:
determining from the detected user input a particular application to be activated; and
activating the determined particular application.

16. A computing device, comprising:
a processor;
a tactile output surface; and
a processor coupled to the tactile output user interface surface, wherein the processor is configured with processor-executable instructions to perform operations comprising:
determining information for communication to a user;
formatting the information for presentation on the tactile output surface to generate formatted information indicative of relative magnitude information; and
activating a localized portion of the tactile output surface to generate a haptic activation area corresponding to the formatted information, wherein the haptic activation area provides a tactile sensation to a user touching the tactile output surface, and wherein a relative size of the haptic activation area in comparison to a size of at least of portion of the tactile output surface is indicative of the relative magnitude information.

17. The computing device of claim 16, wherein the processor is configured with processor-executable instructions to perform operations such that determining the information to be communicated to the user comprises:
accessing data from a data source; and
processing the accessed data to generate information that is suitable for presentation on the tactile output surface.

18. The computing device of claim 16, wherein the processor is configured with processor-executable instructions to perform operations such that formatting the information for presentation on the tactile output surface comprises:
scaling the information to match a range assigned to the tactile output surface;
calculating a relative magnitude value by dividing the scaled information by the range assigned to the tactile output surface; and
using the calculated relative magnitude value as the formatted information.

19. The computing device of claim 16, wherein the tactile output surface comprises three progress bars.

20. The computing device of claim 19, wherein the processor is configured with processor-executable instructions to perform operations comprising:
formatting a first information for presentation on a first of the three progress bars;
formatting a second information for presentation on a second of the three progress bars; and
formatting a third information for presentation on a third of the three progress bars.

21. The computing device of claim 16, wherein the tactile output surface comprises four progress bars.

22. The computing device of claim 21, wherein the processor is configured with processor-executable instructions to perform operations such that the four progress bars comprises:
formatting a first information for presentation on a first of the three progress bars;
formatting a first information for presentation on a second of the three progress bars;

formatting a first information for presentation on a third of the three progress bars; and formatting a first information for presentation on a fourth of the three progress bars.

23. The computing device of claim 16, wherein the tactile output surface comprises at least one tactile unit which when activated by the processor creates a tactile effect that can be felt by a user touching a surface of the at least one tactile unit.

24. The computing device of claim 23, wherein the tactile output surface is configured such that activation creates a tactile effect that can be felt by a user is selected from raising a portion of the surface, depressing a portion of the surface, changing a roughness of a portion of the surface, vibrating a portion of the surface, generating an electrostatic field than can be sensed in skin of the user, and changing a temperature of a portion of the surface.

25. The computing device of claim 16, wherein the processor is configured with processor-executable instructions to perform operations such that formatting the information comprises scaling the information according to a scale factor based on a range of the information and a size of the tactile output surface.

26. The computing device of claim 16, wherein the processor is configured with processor-executable instructions to perform operations such that formatting the information comprises dividing the information by a tactile unit ratio, wherein the tactile unit ratio is determined based on a range of the information and a size of the tactile output surface.

27. The computing device of claim 17, wherein the processor is configured with processor-executable instructions to perform operations such that the data source is defined by the user.

28. The computing device of claim 17, wherein the data source is one of an internal memory and a server accessible via a network.

29. The computing device of claim 16, wherein the processor is configured with processor-executable instructions to perform operations further comprising:

detecting a user input;

activating an application based on the detected user input;

accessing data from a data source directed by the activated application; and processing the accessed data as directed by the activated application to generate information that is suitable for presentation on the tactile output surface.

30. The computing device of claim 29, wherein the processor is configured with processor-executable instructions to perform operations such that activating an application based on the detected user input comprises:

determining from the detected user input a particular application to be activated; and activating the determined particular application.

31. A computing device, comprising:

means for communicating information to a user via the user's sense of touch;

means for determining the information for communication to the user;

means for formatting the information for presentation on the means for communicating information to a user via the user's sense of touch to generate formatted information indicative of relative magnitude information; and means for activating the means for communicating information to a user via the user's sense of touch to generate a haptic activation area corresponding to the formatted information, wherein the haptic activation area corresponds to a localized portion of a tactile output surface and a relative size of the haptic activation area in comparison to a size of at least of portion of the tactile output surface is indicative of the relative magnitude information.

32. The computing device of claim 31, wherein means for determining the information to be communicated to the user comprises:

means for accessing data from a data source; and means for processing the accessed data to generate information that is suitable for presentation on the means for communicating information to a user via the user's sense of touch.

33. The computing device of claim 31, wherein means for formatting the information comprises:

means for scaling the information to match a range assigned to the means for communicating information to a user via the user's sense of touch;

means for calculating a relative magnitude value by dividing the scaled information by the range assigned to the means for communicating information to a user via the user's sense of touch; and means for using the calculated relative magnitude value as the formatted information.

34. The computing device of claim 31, wherein means for communicating information to a user via the user's sense of touch comprises means for generating three progress bars.

35. The computing device of claim 34, wherein means for generating three progress bars comprises:

means for generating a first progress bar corresponding to first formatted information;

means for generating a second progress bar corresponding to second formatted information; and means for generating a third progress bar corresponding to third formatted information.

36. The computing device of claim 31, wherein means for communicating information to a user via the user's sense of touch comprises means for generating four progress bars.

37. The method computing device of claim 36, wherein means for generating four progress bars comprises:

means for generating a first progress bar corresponding to first formatted information;

means for generating a second progress bar corresponding to second formatted information;

means for generating a third progress bar corresponding to third formatted information; and means for generating a fourth progress bar corresponding to fourth formatted information.

38. The computing device of claim 31, wherein means for communicating information to a user via the user's sense of touch comprises means for creating a tactile effect that can be felt by a user touching the means.

39. The computing device of claim 31, wherein means for communicating information to a user via the user's sense of touch is selected from the group consisting of means for raising a portion of the surface, means for depressing a portion of the surface, means for changing a roughness of a portion of the surface, means for vibrating a portion of the surface, means for generating an electrostatic field than can be sensed in skin of the user, and means for changing a temperature of a portion of the surface.

40. The computing device of claim 31, wherein means for formatting the information comprises means for scaling the information according to a scale factor based on a range of the information and a size of the means for communicating information to a user via the user's sense of touch.

41. The computing device of claim 31, wherein means for formatting the information comprises means for dividing the information by a tactile unit ratio, wherein the tactile unit ratio is determined based on a range of the information and a size of the means for communicating information to a user via the user's sense of touch.

42. The computing device of claim 32, wherein the data source is defined by the user.

43. The computing device of claim 32, wherein the data source is one of an internal memory and a server accessible via a network.

44. The computing device of claim 31, further comprising:
means for detecting a user input;
means for activating an application based on the detected user input;
means for accessing data from a data source directed by the activated application; and
means for processing the accessed data as directed by the activated application to generate information that is suitable for presentation on a tactile output surface.

45. The computing device of claim 44, wherein means for activating an application based on the detected user input comprises:
means for determining from the detected user input a particular application to be activated; and
means for activating the determined particular application.

46. A non-transitory computer-readable medium having stored thereon processor-executable instructions configured to cause a processor of a computing device to perform operations comprising:
determining for communication to a user of the computing device to generate formatted information indicative of relative magnitude information;
formatting the information for presentation on a tactile output surface of the computing device; and
activating the tactile output surface of the computing device to generate a haptic activation area corresponding to the formatted information, wherein the haptic activation area provides a tactile sensation to a user touching the tactile output surface, and wherein a relative size of the haptic activation area in comparison to a size of at least of portion of the tactile output surface is indicative of the relative magnitude information.

47. The non-transitory computer-readable medium of claim 46, wherein the stored processor-executable instructions are configured to cause the processor to perform operations such that determining the information to be communicated to the user comprises:
accessing data from a data source; and
processing the accessed data to generate information that is suitable for presentation on the tactile output surface of the computing device.

48. The non-transitory computer-readable medium of claim 46, wherein the stored processor-executable instructions are configured to cause the processor to perform operations such that formatting the information for presentation on the tactile output surface comprises:
scaling the information to match a range assigned to the tactile output surface;
calculating a relative magnitude value by dividing the scaled information by the range assigned to the tactile output surface; and
using the calculated relative magnitude value as the formatted information.

49. The non-transitory computer-readable medium of claim 46, wherein the stored processor-executable instructions are configured to cause the processor to perform operations such that activating the tactile output surface to generate the haptic activation area corresponding to the formatted information comprises activating the tactile output surface to generate three progress bars.

50. The non-transitory computer-readable medium of claim 49, wherein the stored processor-executable instructions are configured to cause the processor to perform operations such that activating the tactile output surface to generate three progress bars comprises:
generating a first progress bar corresponding to first formatted information;
generating a second progress bar corresponding to second formatted information; and
generating a third progress bar corresponding to third formatted information.

51. The non-transitory computer-readable medium of claim 46, wherein the stored processor-executable instructions are configured to cause the processor to perform operations such that activating the tactile output surface to generate the haptic activation area corresponding to the formatted information comprises activating the tactile output surface to generate four progress bars.

52. The non-transitory computer-readable medium of claim 51, wherein the stored processor-executable instructions are configured to cause the processor to perform operations such that activating the tactile output surface to generate four progress bars comprises:
generating a first progress bar corresponding to first formatted information;
generating a second progress bar corresponding to second formatted information;
generating a third progress bar corresponding to third formatted information; and
generating a fourth progress bar corresponding to fourth formatted information.

53. The non-transitory computer-readable medium of claim 46, wherein the stored processor-executable instructions are configured to cause the processor to perform operations such that the tactile output surface of the computing device comprises activating at least one tactile unit that creates a tactile effect that can be felt by a user touching the tactile output surface.

54. The non-transitory computer-readable medium of claim 53, wherein the stored processor-executable instructions are configured to cause the processor to perform operations such that activating at least one tactile unit that creates a tactile effect that can be felt by a user comprises one or more of raising a portion of the surface, depressing a portion of the surface, changing a roughness of a portion of the surface, vibrating a portion of the surface, generating an electrostatic field than can be sensed in skin of the user, and changing a temperature of a portion of the surface.

55. The non-transitory computer-readable medium of claim 46, wherein the stored processor-executable instructions are configured to cause the processor to perform operations such that formatting the information comprises scaling the information according to a scale factor based on a range of the information and a size of the tactile output surface.

56. The non-transitory computer-readable medium of claim 46, wherein the stored processor-executable instructions are configured to cause the processor to perform operations such that formatting the information comprises dividing the information by a tactile unit ratio, wherein the tactile unit ratio is determined based on a range of the information and a size of the tactile output surface.

57. The non-transitory computer-readable medium of claim 47, wherein the stored processor-executable instructions are configured to cause the processor to perform operations such that the data source is defined by the user.

58. The non-transitory computer-readable medium of claim 47, wherein the stored processor-executable instructions are configured to cause the processor to perform operations such that the data source is one of an internal memory and a server accessible via a network.

59. The non-transitory computer-readable medium of claim 46, wherein the stored processor-executable instructions are configured to cause the processor to perform operations further comprising:
   detecting a user input;
   activating an application based on the detected user input;
   accessing data from a data source directed by the activated application; and
   processing the accessed data as directed by the activated application to generate information that is suitable for presentation on a tactile output surface.

60. The non-transitory computer-readable medium of claim 59, wherein the stored processor-executable instructions are configured to cause the processor to perform operations such that activating an application based on the detected user input comprises:
   determining from the detected user input a particular application to be activated; and
   activating the determined particular application.

61. A method of communicating information to a user on a mobile device, comprising:
   determining information to be communicated to the user;
   formatting the information for presentation on a tactile output surface by:
      scaling the information to match a range assigned to the tactile output surface;
      calculating a relative magnitude value by dividing the scaled information by the range assigned to the tactile output surface; and
      using the calculated relative magnitude value as the formatted information; and
   activating a tactile output surface to generate a haptic activation area corresponding to the formatted information, wherein the haptic activation area can be felt by a user touching the tactile output surface.

62. A computing device, comprising:
   a processor;
   a tactile output surface; and
   a processor coupled to the tactile output surface, wherein the processor is configured with processor-executable instructions to perform operations comprising:
      determining information to be communicated to a user;
      formatting the information for presentation on the tactile output surface by:
         scaling the information to match a range assigned to the tactile output surface;
         calculating a relative magnitude value by dividing the scaled information by the range assigned to the tactile output surface; and
         using the calculated relative magnitude value as the formatted information; and
      activating the tactile output surface to generate a haptic activation area corresponding to the formatted information, wherein the haptic activation area can be felt by a user touching the tactile output surface.

63. A computing device, comprising:
   means for communicating information to a user via the user's sense of touch;
   means for determining the information to be communicated to the user;
      means for formatting the information for presentation on the means for communicating information to a user via the user's sense of touch comprising:
         means for scaling the information to match a range assigned to the means for communicating information to a user via the user's sense of touch;
         means for calculating a relative magnitude value by dividing the scaled information by the range assigned to the means for communicating information to a user via the user's sense of touch; and
         means for using the calculated relative magnitude value as the formatted information; and
   means for activating the means for communicating information to a user via the user's sense of touch to generate a haptic activation area corresponding to the formatted information.

64. A non-transitory computer-readable medium having stored thereon processor-executable instructions configured to cause a processor of a computing device to perform operations comprising:
   determining information to be communicated to a user of the computing device;
   formatting the information for presentation on a tactile output surface of the computing device by:
      scaling the information to match a range assigned to the tactile output surface;
      calculating a relative magnitude value by dividing the scaled information by the range assigned to the tactile output surface; and
      using the calculated relative magnitude value as the formatted information; and
   activating the tactile output surface of the computing device to generate a haptic activation area corresponding to the formatted information, wherein the haptic activation area can be felt by a user touching the tactile output surface.

* * * * *